United States Patent
Hozumi et al.

(10) Patent No.: US 7,339,745 B2
(45) Date of Patent: Mar. 4, 2008

(54) ZOOM LENS SYSTEM AND ELECTRONIC IMAGE PICKUP APPARATUS USING THE SAME

(75) Inventors: Kouki Hozumi, Hachioji (JP); Kazuya Nishimura, Akiruno (JP); Masashi Hankawa, Hachioji (JP); Toru Miyajima, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/639,608

(22) Filed: Dec. 14, 2006

(65) Prior Publication Data
US 2007/0146897 A1 Jun. 28, 2007

(30) Foreign Application Priority Data
Dec. 26, 2005 (JP) .............................. 2005-371585

(51) Int. Cl.
*G02B 15/14* (2006.01)
(52) U.S. Cl. ................... 359/682; 359/684; 359/689
(58) Field of Classification Search ................ 359/682, 359/684, 689
See application file for complete search history.

(56) References Cited

U.S. PATENT DOCUMENTS 7,215,484 B2 * 5/2007 Yamashita et al. .......... 359/682

FOREIGN PATENT DOCUMENTS

| JP | 2004-294910 | 10/2004 |
|---|---|---|
| JP | 2005-077692 | 3/2005 |

* cited by examiner

*Primary Examiner*—Scott J. Sugarman
(74) *Attorney, Agent, or Firm*—Kenyon & Kenyon LLP

(57) ABSTRACT

A zoom lens system comprising, a first negative lens unit; a second positive lens unit; and a third negative lens unit, wherein a space between the second and third lens units changes during magnification change or focusing operation; the second lens unit and the third lens unit move only to the object side during the magnification change from a wide-angle end to a telephoto end so that a space between the first and second lens units is narrower in the telephoto end than in the wide-angle end; the first lens unit comprises a negative lens and a positive lens; the second lens unit comprises at most three lenses; the third lens unit comprises a negative lens; and the following condition (1) is satisfied:

$$0.7 < C_j(t)/C_j(w) < 1.2 \qquad (1)$$

26 Claims, 20 Drawing Sheets

ZOOM LENS SYSTEM AND ELECTRONIC IMAGE PICKUP APPARATUS USING THE SAME

CROSS REFERENCE TO RELATED APPLICATIONS

This application claims benefit under 35 U.S.C. §119 of Japanese patent application of No. 2005-371585 filed on Dec. 26, 2005, the contents of which are incorporated herein by reference.

BACKGROUND OF THE INVENTION

1. Field of the Invention

The present invention relates to a zoom lens system and an electronic image pickup apparatus using the same.

2. Description of the Related Art

In recent years, miniaturization of digital still cameras and mounting of image pickup functions on cellular phones have been advanced. In consequence, it is demanded to further miniaturize and thin image pickup lenses. As these image pickup lenses, there are demanded zoom lens systems having a zoom ratio above 2.5 from a wide-angle end to a telephoto end.

As methods for realizing the thin zoom lens systems, there are known a method of bending the optical axis at right angle by disposing a reflecting member in the zoom lens system, and also a method of moving a part of lens units constituting the zoom lens system to the outside of the photographing optical path.

However, the method of bending an optical axis by use of a reflective member requires a space for bending a light ray and a space for moving the lens unit in order to secure the zoom ratio. These spaces are not eliminated even at a time when an image pickup apparatus such as a digital camera is not used. Therefore, the method is disadvantageous to decrease of a volume of the image pickup apparatus when unused. Moreover, layout in the image pickup apparatus is limited due to the bent optical axis.

On the other hand, in the method of moving a part of the lens units to the outside of the photographing optical path when unused, a mechanism to moving the lens units is required. Therefore, it is difficult to suppress an influence in a case where the lens unit is eccentric with respect to the optical axis. Since driving mechanism for moving a part of the lens units is required, it is difficult to suppress the volume of the apparatus when unused. This method is also disadvantageous in view of costs.

As a zoom lens system using a collapsible type lens barrel structure in which the miniaturization is achieved, there are known a two-unit zoom lens system having a refractive power layout of a negative-positive type from an object side; a three-unit zoom lens system of a negative-positive-negative type; and a three-unit zoom lens system of a negative-positive-positive type.

Among them, the two-unit zoom lens system of the negative-positive type is advantageous in decreasing a total thickness of a lens frame which directly holds lenses, because the number of the lens units is small. However, in order to secure the zoom ratio, the second lens unit needs to be moved in a region which includes an equal magnification position of the second lens unit during magnification change. In this case, when the second lens unit is moved to perform focusing, the movement direction of the second lens unit during focusing from infinity to a short distance is reversed in a magnification state before and after the equal magnification position of the second lens unit. Further, when the zoom lens system is focused on infinity while the second lens unit is in the equal magnification position, focusing to the short distance cannot be performed by the movement of the second lens unit. That is, the second lens unit cannot be used as a focusing lens unit. In consequence, the first lens unit or the whole zoom lens system needs to be moved for focusing, and the total length of the lens barrel including the focusing mechanism increases. Therefore, this type is disadvantageous in thinning the zoom lens system and securing the zoom ratio.

On the other hand, the zoom lens system of the negative-positive-negative type and the zoom lens system of the negative-positive-positive type are advantageous to the miniaturization in that the increase of the total length can be suppressed by performing focusing by the third lens unit.

Moreover, in the zoom lens system of the negative-positive-positive type, a fluctuation of the exit pupil position during magnification change easily increases. Therefore, a change of an incidence angle of an off-axial ray on a peripheral portion of an image sensor during magnification change easily increases, and a change of an image quality in a peripheral portion of an image easily occurs. A diameter of a front lens (a diameter of the first lens unit) easily increases, an outer diameter of the lens frame increases, and the system is disadvantageous to the miniaturization.

On the other hand, in the zoom lens system of the negative-positive-negative type, the fluctuation of the exit pupil position during magnification change is little, and it is easy to reduce the change of the incidence angle of the off-axial ray on the peripheral portion of the image sensor during magnification change. Since the third lens unit having a negative refractive power has a function of shifting the principal point of the whole zoom lens system toward an object side, it is possible to reduce the total length of the zoom lens system. It is also easy to generally reduce the ray height incident on each lens unit of the zoom lens system for the size of the image pickup surface of the image sensor. This type is especially advantageous in reducing the diameter of the front lens. Therefore, the type is also advantageous to decrease of the diameter of the lens frame.

As a zoom lens system of the negative-positive-negative type, there is known a zoom lens system in which the third lens unit moves to a position closer to the image side in the telephoto end than in the wide-angle end or hardly moves. However, in the zoom lens system of this type, since the third lens unit is positioned close to the image surface in the telephoto end, the height of an off-axial ray increases in the third lens unit, and the diameter of the third lens unit easily increases. In the case where the third lens unit moves for focusing operation, the focusing sensitivity (the movement amount of the image surface position at a time when the focusing lens moves as much as a unit movement amount) easily decreases. Therefore, the third lens unit necessarily has a strong negative power, and it is difficult to suppress generation of aberration in the third lens unit.

As examples of the zoom lens system in which the number of lenses constituting the lens system is small and the third lens unit moves toward the object side during magnification change toward the telephoto end (toward the side having a long focal length), there are known zoom lens systems described in Examples 1 to 3 of Japanese Patent Application Laid-Open No. 2004-294910 and Examples 1 to 3 of Japanese Patent Application Laid-Open No. 2005-77692.

BRIEF SUMMARY OF THE INVENTION

A zoom lens system according to the present invention comprises, in order from an object side: a first lens unit having a negative refractive power; a second lens unit having a positive refractive power; and a third lens unit having a negative refractive power, wherein a space between the first lens unit and the second lens unit changes during magnification change, a space between the second lens unit and the third lens unit changes during magnification change or focusing operation;

at least the second lens unit and the third lens unit move only to the object side during magnification change from a wide-angle end to a telephoto end so that the space between the first lens unit and the second lens unit is narrower in the telephoto end than in the wide-angle end;

the first lens unit comprises, in order from the object side, two lenses including a negative lens and a positive lens, the total number of the lenses included in the first lens unit is two;

the second lens unit comprises at most three lenses;

the third lens unit comprises a negative lens, the total number of the lenses included in the third lens unit is one; and the following condition (1) is satisfied:

$$0.7 < C_j(t)/C_j(w) < 1.2 \quad (1),$$

wherein $C_j(w)$ is a distance from an incidence surface of the first lens unit to an image surface of the zoom lens system in the wide-angle end, and $C_j(t)$ is a distance from the incidence surface of the first lens unit to the image surface of the zoom lens system in the telephoto end.

In addition, in one aspect according to the present invention, the following condition (2) is satisfied:

$$1.6 < \beta_2(t)/\beta_2(w) < 2.5 \quad (2),$$

wherein $\beta_2(w)$ is a lateral magnification of the second lens unit in the wide-angle end, and $\beta_2(t)$ is a lateral magnification of the second lens unit in the telephoto end.

In another aspect, the following condition (3) is satisfied:

$$1.0 < \{\beta_2(t)/\beta_2(w)\}/\{\beta_3(t)/\beta_3(w)\} < 2.5 \quad (3),$$

wherein $\beta_2(w)$ is a lateral magnification of the second lens unit in the wide-angle end, $\beta_2(t)$ is a lateral magnification of the second lens unit in the telephoto end, $\beta_3(w)$ is a lateral magnification of the third lens unit in the wide-angle end, and $\beta_3(t)$ is a lateral magnification of the third lens unit in the telephoto end.

In still another aspect, the following condition (4) is satisfied:

$$1.25 < |f_1/f_2| < 1.86 \quad (4),$$

wherein $f_1$ is a focal length of the first lens unit, and $f_2$ is a focal length of the second lens unit.

The zoom lens system according to the present invention can be used as an image pickup lens of an image pickup apparatus including an image sensor which converts an optical image into an electric signal. In this case, it is preferable that the image pickup apparatus comprises: the zoom lens system according to the present invention; and an image sensor which is disposed on an image side of the zoom lens system and which converts an optical image into an electric signal.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 1A shows a state in a wide-angle end, FIG. 1B shows an intermediate state, and FIG. 1C shows a state in a telephoto end;

FIG. 2A shows a state in a wide-angle end, FIG. 2B shows an intermediate state, and FIG. 2C shows a state in a telephoto end;

FIG. 3A shows a state in a wide-angle end, FIG. 3B shows an intermediate state, and FIG. 3C shows a state in a telephoto end;

FIG. 4A shows a state in a wide-angle end, FIG. 4B shows an intermediate state, and FIG. 4C shows a state in a telephoto end;

FIG. 5A shows a state in a wide-angle end, FIG. 5B shows an intermediate state, and FIG. 5C shows a state in a telephoto end;

FIG. 6A shows a state in a wide-angle end, FIG. 6B shows an intermediate state, and FIG. 6C shows a state in a telephoto end;

FIG. 7A shows a state in a wide-angle end, FIG. 7B shows an intermediate state, and FIG. 7C shows a state in a telephoto end;

FIG. 8A shows a state in a wide-angle end, FIG. 8B shows an intermediate state, and FIG. 8C shows a state in a telephoto end;

FIG. 9A shows a state in the wide-angle, FIG. 9B shows an intermediate state, and FIG. 9C shows a state in the telephoto end;

FIG. 10A shows a state in the wide-angle, FIG. 10B shows an intermediate state, and FIG. 1C shows a state in the telephoto end;

FIG. 11A shows a state in the wide-angle, FIG. 11B shows an intermediate state, and FIG. 11C shows a state in the telephoto end;

FIG. 12A shows a state in the wide-angle, FIG. 12B shows an intermediate state, and FIG. 12C shows a state in the telephoto end;

FIG. 13A shows a state in the wide-angle, FIG. 13B shows an intermediate state, and FIG. 13C shows a state in the telephoto end;

FIG. 14A shows a state in the wide-angle, FIG. 14B shows an intermediate state, and FIG. 14C shows a state in the telephoto end;

FIG. 15A shows a state in the wide-angle, FIG. 15B shows an intermediate state, and FIG. 15C shows a state in the telephoto end;

FIG. 16A shows a state in the wide-angle, FIG. 16B shows an intermediate state, and FIG. 16C shows a state in the telephoto end;

DETAILED DESCRIPTION OF THE PREFERRED EMBODIMENTS

Figure 1A:
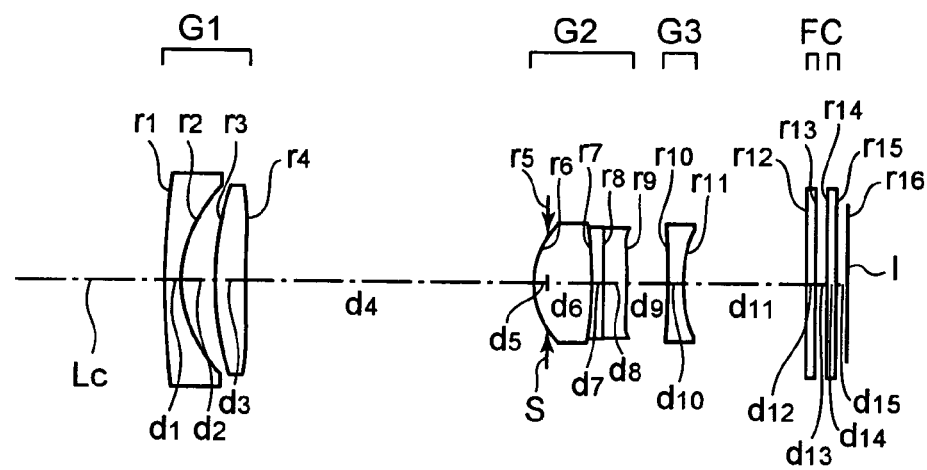
FIGS. 1A to 1C are sectional views of Example 1 of the present invention when focused on an infinite object.

As described above, a zoom lens system according to the present invention comprises, in order from an object side, a first lens unit having a negative refractive power, a second lens unit having a positive refractive power and a third lens unit having a negative refractive power.

A space between the first lens unit and the second lens unit changes during magnification change, and a space between the second lens unit and the third lens unit changes during magnification change or focusing operation.

At least the second lens unit and the third lens unit move only to the object side during magnification change from a wide-angle end to a telephoto end so that the space between the first lens unit and the second lens unit is narrower in the telephoto end than in the wide-angle end.

The first lens unit comprises, in order from the object side, two lenses including a negative lens and a positive lens, and the total number of the lenses included in the first lens unit is two.

The second lens unit comprises at most three lenses.

The third lens unit comprises a negative lens, and the total number of the lenses included in the third lens unit is one.

The following condition (1) is satisfied:

$$0.7 < C_j(t)/C_j(w) < 1.2 \qquad (1),$$

wherein $C_j(w)$ is a distance from an incidence surface of the first lens unit to an image surface of the zoom lens system in the wide-angle end, and $C_j(t)$ is a distance from the incidence surface of the first lens unit to the image surface of the zoom lens system in the telephoto end.

In the above constitution, since the final lens unit is constituted to have the negative refractive power, the principal point position of the zoom lens system comes close to the object side. Therefore, the total length of the zoom lens system can be shortened, and the constitution is advantageous to thinning of a lens barrel. Since a height of an off-axial ray decreases in the wide-angle end, the diameter of the front lens can be reduced, and the diameter of the lens barrel can also be reduced. Since a fluctuation of the angle of rays emitted from the zoom lens system during zooming operation is small, it is easy to suppress a change of an image quality on the periphery on an image during magnification change.

Moreover, the third lens unit is constituted so as to move toward the object side during magnification change to the telephoto end. Therefore, as compared with a case where the third lens unit is fixed or moves toward an image side during magnification change, the ray height in the third lens unit can be lowered. Therefore, the constitution is also advantageous to reduction of a diameter of the third lens unit.

Especially, since the third lens unit is constituted of one negative lens, a constitution is simplified so as to include the minimum number of the lenses, and the constitution is advantageous to miniaturization in a collapsed state of the zoom lens system. In a case where the third lens unit is used as a focusing unit, since a weight of the third lens unit decreases, it is possible to realize a compact drive system. It is more preferable that the negative lens of the third lens unit is a plastic lens.

Furthermore, since the first lens unit is constituted of two lenses, the principal point of the first lens unit can be brought close to the object side. This is useful in miniaturizing the zoom lens system when used and obtaining an appropriate balance of an aberration such as a chromatic aberration. This constitution is also effective for maintaining an optical performance consistently with the thinning of the lens barrel in a collapsed state of the zoom lens system.

In addition, the second lens unit is constituted of three or less lenses, and the miniaturization in a collapsed state of the zoom lens system is easily performed.

As described above, the number of the lenses constituting each lens unit is limited to perform the miniaturization in the collapsed state of the zoom lens system.

The condition (1) is a condition which defines an appropriate total length of the zoom lens system in order to realize a small-sized zoom lens system having a zoom ratio of 2.5 or more. When the value of $C_j(t)/C_j(w)$ is not below the lower limit value of 0.7 of the condition (1), the total length of the zoom lens system is inhibited from being increased in the wide-angle end. The ray height in the first lens unit is lowered to reduce the front lens diameter, and it is possible to obtain an effect of the miniaturization. When the value of $C_j(t)/C_j(w)$ is not above the upper limit value of 1.2 of the condition (1), the total length of the zoom lens system is inhibited from being increased in the telephoto end. When the total length of the zoom lens system is suppressed in this manner, the total length of the lens barrel can be shortened. This constitution is advantageous in simplifying a constitution of the lens barrel and reducing a thickness of the lens barrel in the collapsed state of the zoom lens system.

In addition, in one aspect according to the present invention, the following condition (2) is satisfied:

$$1.6 < \beta_2(t)/\beta_2(w) < 2.5 \qquad (2),$$

wherein $\beta_2(w)$ is a lateral magnification of the second lens unit in the wide-angle end, and $\beta_2(t)$ is a lateral magnification of the second lens unit in the telephoto end.

This condition defines an appropriate burden of magnification change on the second lens unit in order to obtain a desired zoom ratio.

When the value of $\beta_2(t)/\beta_2(w)$ is not below the lower limit of 1.6 of the condition (2), the constitution is advantageous in securing the zoom ratio. When the value of $\beta_2(t)/\beta_2(w)$ is not above the upper limit of 2.5 of the condition (2), the total length of the zoom lens system in the telephoto end is inhibited from being increased, and the constitution is advantageous to thinning of the lens barrel.

Moreover, in another aspect of the present invention, in addition to the condition (1), the following condition (3) is satisfied:

$$1.0 < \{\beta_2(t)/\beta_2(w)\}/\{\beta_3(t)/\beta_3(w)\} < 2.5 \quad (3),$$

wherein $\beta_2(w)$ is a lateral magnification of the second lens unit in the wide-angle end, $\beta_2(t)$ is a lateral magnification of the second lens unit in the telephoto end, $\beta_3(W)$ is a lateral magnification of the third lens unit in the wide-angle end, and $\beta_3(t)$ is a lateral magnification of the third lens unit in the telephoto end.

This condition defines an appropriate burden ratio of magnification change between the second lens unit and the third lens unit in order to obtain a desired zoom ratio.

When the value of $\{\beta_2(t)/\beta_2(w)\}/\{\beta_3(t)/\beta_3(w)\}$ is not below the lower limit of 1.0 of the condition (3), an angle of an off-axial ray emitted from the zoom lens system in the wide-angle end is inhibited from being increased, and the constitution is advantageous in suppressing shading. Alternatively, the total length of the zoom lens system in the telephoto end is easily suppressed, and the constitution is advantageous to the thinning of the lens barrel. When the value of $\{\beta_2(t)/\beta_2(w)\}/\{\beta_3(t)/\beta_3(w)\}$ is not above the upper limit of 2.5 of the condition (3), the movement amount of the second lens unit for magnification change is suppressed, and the constitution is advantageous to the thinning of the lens barrel. Alternatively, when focusing is performed by movement of the third lens unit, the constitution is advantageous in maintaining the focusing sensitivity of the third lens unit. In consequence, the constitution is advantageous in suppressing a necessary movement amount for the focusing on an object at a short distance and thinning the lens barrel.

Moreover, in still another aspect of the present invention, in addition to the condition (1), the following condition (4) is satisfied:

$$1.25 < |f_1/f_2| < 1.86 \quad (4),$$

wherein $f_1$ is a focal length of the first lens unit, and $f_2$ is a focal length of the second lens unit.

This condition defines a refractive power layout for miniaturizing the zoom lens system and satisfactorily correcting various aberrations.

When the value of $|f_1/f_2|$ is not below the lower limit value of 1.25 of the condition (4), it is easy to inhibit a position of an image formed by the composite lens system formed of the first and second lens units from being away from the second lens unit to the image side. This is advantageous in suppressing an increase of the total length of the zoom lens system and thinning the lens barrel. Alternatively, the constitution is advantageous in suppressing the negative refractive power of the first lens unit to reduce an amount of distortion to be generated in the wide-angle end.

When the value of $|f_1/f_2|$ is not above the upper limit value of 1.86 of the condition (4), the power of the first lens unit can be prevented from being excessively weakened. This is advantageous in securing efficiency of magnification change of the second lens unit and reducing the total length of the zoom lens system. Alternatively, the constitution is advantageous in preventing the refractive power of the second lens unit having an image forming function from being excessively strengthened, miniaturizing the zoom lens system and maintaining aberrations in a satisfactory corrected state.

It is to be noted that the combination of the conditions is not limited to that described above. The zoom lens system according to the present invention can be constituted so as to satisfy an arbitrary combination of the above conditions.

In the above zoom lens system, it is preferable that the focusing is performed by moving only the third lens unit. As described above, the third lens unit is positioned closer to the object side in the telephoto end. In this case, the focusing sensitivity of the third lens unit increases, and the power of the third lens unit can be weakened. Therefore, the thickness of the edge of the third lens unit can be reduced, and this constitution is advantageous to the thinning of the zoom lens system in the collapsed state.

Moreover, since the thickness of the third lens unit is reduced to suppress weights of lenses, the driving mechanism for focusing can be simplified, and this constitution contributes to the miniaturization of the lens barrel.

Furthermore, a constitution in which the space between the second lens unit and the third lens unit changes during the magnification change is effective for adjustment of the image position during magnification change and suppression of aberration fluctuation during magnification change.

Moreover, the adjustment of the image position during the magnification from the wide-angle end to the telephoto end is performed by moving the first lens unit to the image side and then moves to the object side. In a case where the space between the second lens unit and the third lens unit changes during magnification change, when movement amounts are mutually adjusted, the aberration fluctuation due to magnification change is also suppressed.

Furthermore, it is preferable that the following condition (5) is satisfied:

$$1.42 < D_1(w)/f_w < 1.80 \quad (5),$$

wherein $D_1(w)$ is a space between the first lens unit and the second lens unit along an optical axis in the wide-angle end, and $f_w$ is a focal length of the zoom lens system in the wide-angle end.

This condition (5) defines the space between the first lens unit and the second lens unit in the wide-angle end in order to achieve a more satisfactory balance among the miniaturization, the increase of the zoom ratio and the securing of the optical performance.

When the value of $D_1(w)/f_w$ is not below the lower limit of 1.42 of the condition (5), it is possible to maintain a space for moving the lens unit. This contributes to the inhibiting of the refractive powers of the first and second lens units from being excessively increased and the securing of the zoom ratio. Therefore, the constitution is advantageous in correcting aberrations and maintaining the zoom ratio. When the value of $D_1(w)/f_w$ is not above the upper limit of 1.80 of the condition (5), the constitution is advantageous in inhibiting the ray height in the first lens unit from being increased and suppressing an increase of the front lens diameter. Alternatively, the constitution is advantageous in suppressing the increase of the total length of the zoom lens system and thinning the lens barrel in the collapsed state.

Furthermore, it is preferable that the focusing operation is performed by the movement of the third lens unit and the following condition (6) is satisfied:

$$0.5 < D_2(t)/D_2(w) < 2.0 \quad (6),$$

wherein $D_2(w)$ is a space between the second lens unit and the third lens unit along the optical axis in the wide-angle end, and $D_2(t)$ is a space between the second lens unit and the third lens unit along the optical axis in the telephoto end.

This condition (6) is a condition which defines a preferable way to change the space between the second lens unit and the third lens unit in a case where the third lens unit is used as a focusing lens unit.

When the value of $D_2(t)/D_2(w)$ is not below the lower limit of 0.5 of the condition (6), the constitution is advantageous in maintaining a space between the positive refractive power and the negative refractive power of the telephoto type lens system constituted of a composite lens system (having a positive refractive power) formed of the first and second lens units and the third lens unit having a negative refractive power. This contributes to reduce the total length of the zoom lens system in the telephoto end. When the value of $D_2(t)/D_2(w)$ is not above the upper limit of 2.0 of the condition (6), the constitution is advantageous in suppressing the movement amount of the third lens unit for the focusing on the object at a the short distance, and thinning the lens barrel.

Moreover, it is preferable that the focusing operation is performed by the movement of the third lens unit, and the following condition (7) is satisfied:

$$-0.3<(D_2(t)-D_2(w))/f_w<0.25 \qquad (7),$$

wherein $D_2(w)$ is a space between the second lens unit and the third lens unit along the optical axis in the wide-angle end, $D_2(t)$ is a space between the second lens unit and the third lens unit along the optical axis in the telephoto end, and $f_w$ is a focal length of the zoom lens system in the wide-angle end.

This condition (7) also defines a preferable way to change the space between the second lens unit and the third lens unit in a case where the third lens unit is used as a focusing lens unit.

When the value of $(D_2(t)-D_2(w))/f_w$ is not below the lower limit of −0.3 of the condition (7), the constitution is advantageous to the reduction of the total length of the zoom lens system in the telephoto end, and advantageous to the reduction of the total length of the lens barrel. When the condition (7) is not above the upper limit of 0.25, the movement amount of the third lens unit for the focusing during the image pickup along the short distance is suppressed, and the constitution is advantageous to the thinning of the lens barrel.

Moreover, it is preferable that the second lens unit is constituted so as to include a positive lens and a negative lens. This contributes to reduce generation of aberrations in the second lens unit while reducing number of lenses in the second lens unit. When the positive lens and the negative lens are cemented to constitute a cemented lens, it is possible to eliminate an air space in the second lens unit. This constitution is advantageous to miniaturization of the second lens unit itself, reduction of an influence of eccentricity on the aberration, reduction of the chromatic aberration and securing of a space for movement of the third lens unit. When the second lens unit is constituted of only the cemented lens, the second lens unit may be held by holding at least a portion of any of the lenses of the second lens unit. In consequence, since the structure of the lens frame is simplified and the thickness of the lens frame can be reduced, the constitution is advantageous to the thinning of the zoom lens system in the collapsed state.

In addition, a constitution in which the second lens unit includes three lenses of a positive lens, a negative lens and a positive lens in order from the object side is advantageous to the reduction of the aberration of the second lens unit itself.

Moreover, when the incidence-side surface of the cemented lens is formed into such a shape that the surface has a positive refractive power on the optical axis and the refractive power of a portion on the surface decrease with the distance from the optical axis, this constitution is advantageous in securing the positive refractive power of the second lens unit, bringing the principal point close to the object side to thereby secure the zoom ratio and correcting spherical aberration which is easily generated in this surface.

Furthermore, when an emission-side surface of the cemented lens is preferably formed into such a shape that the refractive power decreases (the positive refractive power weakens or the negative refractive power strengthens) in a peripheral portion of the surface (as the portion is farther from the optical axis), this constitution is advantageous to correction of field curvature.

In addition, when the Abbe number of the negative lens in the cemented lens is set to be smaller than that of any positive lens in the cemented lens, a cemented surface is constituted of a concave surface of the negative lens and the refractive power of the cemented surface is set to be negative, the chromatic aberration can satisfactorily be corrected. That is, the spherical aberration can mainly be controlled with the object side surface of the cemented lens, the chromatic aberration can be controlled by mainly controlling the power and the Abbe number of the central negative lens rather than the surface shape of the lens, and an off-axial aberration can mainly be controlled with the image side surface of the cemented lens. It is to be noted that since the cemented surface also has an effect of controlling aberrations, it is preferable to use the effect together with the above described main effect.

Moreover, the second lens unit may be constituted of, in order from the object side, a single lens having a positive refractive power and one cemented lens including a negative lens and a positive lens. The second lens unit has a generally symmetric refractive power layout in which the negative refractive powers are disposed before and after the positive refractive power. The layout is advantageous to the aberration correction. It is easy to obtain the above described effect produced by cementing the positive lens and the negative lens.

Furthermore, in a case where the single lens of the second lens unit is a lens in which a refractive power of the image-side surface is larger than that of the object-side surface, the constitution is advantageous to the increase of the zoom ratio due to the adjustment of the position of the principal point and the miniaturization of the second lens unit due to a converging function of an axial light flux.

In addition, when the image-side surface of the cemented lens is a convex surface, the constitution is advantageous in offsetting various aberrations of the third lens unit having the negative refractive-power and various aberrations of the cemented lens to correct the aberration of the whole zoom lens system.

Moreover, the second lens unit may be constituted of, in order from the object side, a single lens having a positive refractive power and one cemented lens including a positive lens and a negative lens. This constitution easily brings the principal point of the second lens unit close to the object side, and is advantageous in increasing the zoom ratio while suppressing the total length of the zoom lens system in the telephoto end. The constitution is also advantageous to the reduction of the diameter of the second lens unit. It is also possible to obtain an effect produced by cementing the positive lens and the negative lens as described above.

Furthermore, in a case where the single lens of the second lens unit is a lens in which the refractive power of the object-side surface is larger than that of the image-side surface, the constitution is advantageous to the increase of the zoom ratio due to the adjustment of the position of the principal point and the miniaturization of the second lens unit due to the converging function of the axial light flux.

In addition, when the image-side surface of the cemented lens is a convex surface, the constitution is advantageous in offsetting various aberrations of the third lens unit having the negative refractive power and various aberrations of the cemented lens to correct the aberration of the whole zoom lens system.

Moreover, the second lens unit may be constituted of, in order from the object side, one cemented lens including a positive lens and a negative lens and a single lens having a positive refractive power. According to this constitution, the refractive power layout of the second lens unit is a generally symmetric layout in which the positive refractive powers are arranged before and after the negative refractive power, respectively. The constitution is advantageous to the aberration correction. It is easy to obtain the effect produced by cementing the positive lens and the negative lens as described above.

Furthermore, in a case where the cemented lens of the second lens unit is formed into a meniscus shape whose convex surface faces the object side, the constitution is advantageous to the increase of the zoom ratio due to the adjustment of the position of the principal point and the miniaturization of the second lens unit due to the converging function of the axial light flux.

In addition, when the image-side surface of the single lens of the second lens unit is a convex surface, the constitution is advantageous in offsetting various aberrations of the third lens unit having the negative refractive power and various aberrations of the single lens to correct the aberration of the whole zoom lens system.

Moreover, when this single lens is a double-convex lens, a space in the second lens unit can be reduced and the thickness of the second lens unit can be reduced.

Furthermore, the second lens unit may be constituted of one cemented lens including a positive lens and a negative lens in order from the object side. This constitution is advantageous to the miniaturization and cost reduction of the second lens unit.

In addition, in a case where the cemented lens is a lens in which the refractive power of the object-side surface is larger than that of the image-side surface, the constitution is advantageous to the increase of the zoom ratio due to the adjustment of the position of the principal point and the miniaturization of the second lens unit due to the converging function of the axial light flux.

Moreover, the second lens unit may be constituted of one cemented lens including three lenses of a positive lens, a negative lens and a negative lens in order from the object side. This constitution is advantageous in eliminating the air space in the second lens unit to miniaturize the second lens unit itself, reducing the influence of the eccentricity on the aberration and securing the space for movement of the third lens unit. Since the second lens unit is constituted of only the cemented lens, the second lens unit may be held by holding at least a portion of any of the lenses of the second lens unit, and the thickness of the lens frame can be reduced. Therefore, the constitution is advantageous to the thinning of the zoom lens system in the collapsed state. The constitution is also advantageous in bringing the principal point close to the object side to secure the zoom ratio.

Furthermore, when the incidence-side surface of the cemented lens is formed into such a shape that the surface has a positive refractive power on the optical axis and the refractive power of a portion on the surface decreases with the distance from the optical axis, this constitution is advantageous in securing the positive refractive power of the second lens unit, bringing the principal point close to the object side to thereby secure the zoom ratio and correcting the spherical aberration which is easily generated in this surface.

In addition, when the emission-side surface of the cemented lens is formed into such a shape that the refractive power decreases (the positive refractive power weakens or the negative refractive power strengthens) in the peripheral portion of the surface (as the portion is farther from the optical axis), this constitution is advantageous to the correction of field curvature.

Moreover, it is preferable to satisfy the following condition (8):

$$1.2 < C_j(t)/f_t < 1.8 \qquad (8),$$

wherein $C_j(t)$ is a distance from an incidence surface of the first lens unit to the image surface in the telephoto end, and $f_t$ is a focal length of the zoom lens system in the telephoto end.

This condition (8) defines the total length of the zoom lens system in the telephoto end, which is normalized with the focal length in the telephoto end. This is a condition for reducing the total length to thereby further simplify the constitution of a lens barrel.

When the value of $C_j(t)/f_t$ is not below the lower limit of 1.2 of the condition (8), the increase of the total length of the zoom lens system in the wide-angle end is easily suppressed. Alternatively, a desired zoom ratio is easily obtained. When the value of $C_j(t)/f_t$ is not above the upper limit of 1.8 of the condition (8), the increase of the total length of the lens barrel is easily suppressed, and the constitution is advantageous to the miniaturization.

Furthermore, it is preferable that the third lens unit moves for focusing, and the following condition (9) is satisfied:

$$1.5 < |f_3/f_w| < 15.0 \qquad (9),$$

wherein $f_3$ is a focal length of the third lens unit, and $f_w$ is a focal length of the zoom lens system in the wide-angle end.

This condition (9) defines the focal length of the third lens unit normalized with the focal length of the zoom lens system in the wide-angle end. Since the zoom lens system according to the present invention is constituted so that the third lens unit moves to the object side during magnification change to the telephoto end as described above, it is advantageous to the miniaturization of the third lens unit. In addition, since the third lens unit is a negative lens, the constitution is advantageous to the miniaturization of an optical system, especially the diameter of the front lens. When this third lens unit is used as a focusing lens unit, the focusing sensitivity of the third lens unit in the telephoto end is easily increased. Therefore, the refractive power of the third lens unit can appropriately be reduced so as to satisfy the condition (9), and the constitution is more advantageous to the miniaturization.

When the value of $|f_3/f_w|$ is not below the lower limit of 1.5 of the condition (9), the refractive power of the third lens unit is suppressed, and the influence on the aberration is easily reduced. The increase of the thickness of the edge of the third lens unit is suppressed, and the constitution is advantageous to the thinning of the lens frame. When the value of $|f_3/f_w|$ is not above the upper limit of 15.0 of the condition (9), the amount of movement of the third lens unit for focusing is suppressed, and this constitution is advantageous to the thinning of the zoom lens system.

Moreover, it is preferable to satisfy the following condition (10) so that the third lens unit is a negative lens having an appropriate thickness:

$$0.01 < D_{3G}/f_t < 0.09 \tag{10},$$

wherein $D_{3G}$ is a thickness of the third lens unit along the optical axis, and $f_t$ is a focal length of the zoom lens system in the telephoto end.

When the value of $D_{3G}/f_t$ is not below the lower limit of 0.01 of the condition (10), the constitution is advantageous in securing strength of the negative lens of the third lens unit. When the value of $D_{3G}/f_t$ is not above the upper limit of 0.09 of the condition (10), the thickness of the third lens unit along the optical axis is suppressed, and the constitution is advantageous to the miniaturization of the zoom lens system in the collapsed state.

Moreover, when focusing is performed by the movement of the third lens unit, the focusing sensitivity of the third lens unit depends on the magnification of the third lens unit. Therefore, it is preferable to satisfy the following condition (B) so that the focusing sensitivity of the third lens unit in the telephoto end has an appropriate value:

$$-3.5 < 1-\beta_3(t)^2 < -0.6 \tag{B},$$

wherein $\beta_3(t)$ is a lateral magnification of the third lens unit in the telephoto end.

When the value of $(1-\beta_3(t)^2)$ is not below the lower limit of −3.5 of the condition (B), an absolute value of the lateral magnification in the third lens unit is reduced. Therefore, the focusing sensitivity is inhibited from being excessively increased, and the constitution is advantageous in securing precision of focusing. When the value of $(1-\beta_3(t)^2)$ is not above the upper limit of −0.6 of the condition (B), the focusing sensitivity can be secured. Therefore, the space for movement of the third lens unit for focusing operation can be reduced, and the constitution is advantageous to miniaturization of a driving mechanism.

Furthermore, it is preferable to satisfy the following condition (A):

$$2.5 \leq f_t/f_w < 5.5 \tag{A},$$

wherein $f_t$ is a focal length of the zoom lens system in the telephoto end, and $f_w$ is a focal length of the zoom lens system in the wide-angle end.

This condition (A) defines the zoom ratio of the zoom lens system. When the zoom ratio is set to an appropriate value of 2.5 or more, the size of the zoom lens system and the optical performance of the system are preferably easily balanced.

When the value of $f_t/f_w$ is not below the lower limit of 2.5 of the condition (A), a zoom ratio sufficient for general use is obtained. When the value of $f_t/f_w$ is not above the upper limit of 5.5 of the condition, costs are advantageously reduced by suppressing an increase of the number of the lenses for correction of aberrations.

Moreover, it is preferable that an aperture stop is disposed immediately before the second lens unit, and moves integrally with the second lens unit during magnification change. In consequence, the increase of the diameter of the first lens unit can be prevented. Moreover, an off-axial chief ray emitted from the third lens unit is easily brought close to a parallel state with respect to the optical axis. Since the lenses of the second lens unit are arranged only on the image side of the aperture stop, it is possible to inhibit deterioration of aberrations due to relative eccentricities among the lenses of the second lens unit. Since a mechanism for moving the aperture stop can be shared by the second lens unit, the constitution can easily be simplified.

The zoom lens system according to the present invention can be used as a photographing lens of an image pickup apparatus including an image sensor which converts an optical image into an electric signal. In this case, it is preferable that the image pickup apparatus includes the zoom lens system according to the present invention; and an image sensor which is disposed on the image side of the zoom lens system and which converts the optical image into the electric signal.

The zoom lens system according to the present invention can be constituted so that the above constitutions and conditions may be combined arbitrarily and satisfied simultaneously. In consequence, more satisfactory effect can be obtained.

Moreover, in order to further improve the above effects, the conditions may be modified as follows.

In the condition (1), it is more preferable to set the lower limit value to 0.75, further preferably 0.78. It is more preferable to set the upper limit value to 1.1, further preferably 1.05.

In the condition (2), it is more preferable to set the lower limit value to 1.7, further preferably 1.75.

In the condition (3), it is more preferable to set the lower limit value to 1.1. It is more preferable to set the upper limit value to 2.3.

In the condition (6), it is more preferable to set the lower limit value to 0.55. It is more preferable to set the upper limit value to 1.7, further preferably 1.5.

In the condition (8), it is more preferable to set the lower limit value to 1.3, further preferably 1.35. It is more preferable to set the upper limit value to 1.7, further preferably 1.5.

In the condition (9), it is more preferable to set the lower limit value to 1.8, further preferably 2.0. It is more preferable to set the upper limit value to 10.0, further preferably 7.0.

In the condition (10), it is more preferable to set the lower limit value to 0.02, further preferably 0.03. It is more preferable to set the upper limit value to 0.07, further preferably 0.055.

In the condition (A), it is more preferable to set the lower limit value to 2.6, further preferably 2.7. It is more preferable to set the upper limit value to 4.5, further preferably 3.5.

In the condition (B), it is more preferable to set the lower limit value to −3.3. It is more preferable to set the upper limit value to −1.0.

In the zoom lens system according to the present invention, without bending the optical axis or moving a part of the lens units to the outside of the photographing optical path, an appropriate zoom ratio can be secured. Moreover, the zoom lens system is advantageous in respect of the miniaturization and the securing of the optical performance.

Next, there will be described examples according to the present invention.

FIGS. 1A to 8C are sectional views of Examples 1 to 8 when focused on an infinite object. Among these drawings, FIGS. 1A, 2A, 3A, . . . show sectional views in wide-angle ends, FIGS. 1B, 2B, 3B, . . . show sectional views in intermediate states, and FIGS. 1C, 2C, 3C, . . . show sectional views in telephoto ends, respectively. In the drawings, a first lens unit is denoted with G1, an aperture stop is denoted with S, a second lens unit is denoted with G2, a third lens unit is denoted with G3, and a flare stop is denoted with FS. A plane parallel plate (or a plurality of plane parallel plates) including a low pass filter coated with an IR cut coating or the like is denoted with F, a plane parallel plate which is a cover glass of an electronic image sensor (a CCD image sensor or a CMOS image sensor) is denoted with C, and an image surface is denoted with 1. When each example is used as a photographing lens of an image pickup apparatus including an electronic image sensor, the light receiving surface of the image sensor is disposed in the position of the image surface 1. It is to be noted that a multilayered film for restricting a wavelength region may be disposed on the surface of the cover glass C. The cover glass C may be provided with a low pass filter function.

Figure 1B:
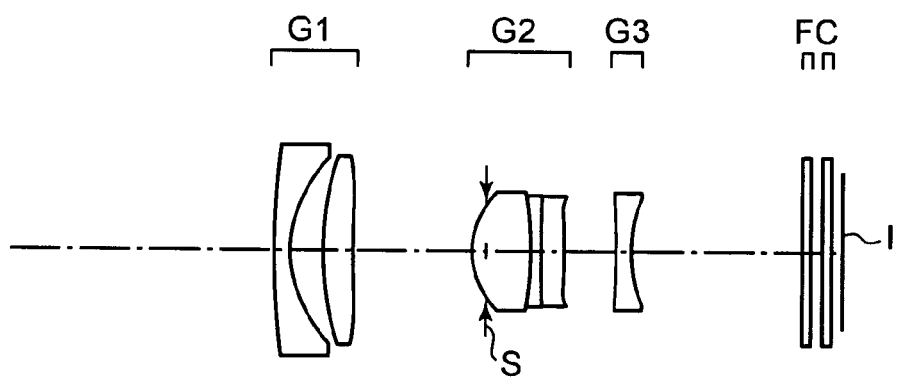
Figure 1C:
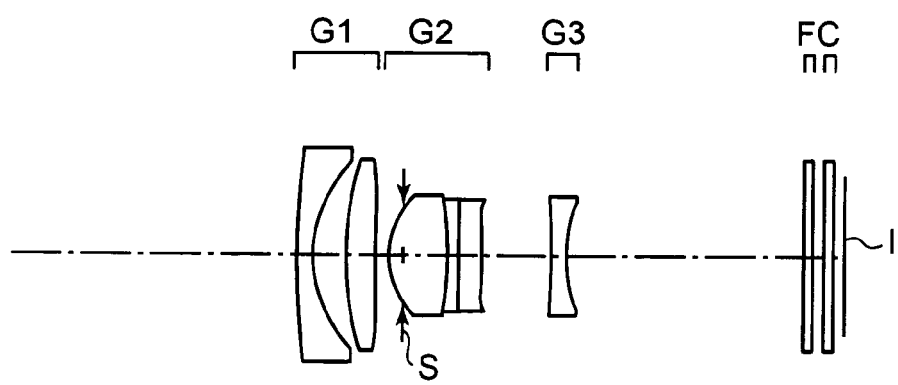

As shown in FIGS. 1A to 1C, Example 1 includes, in order from an object side, a first lens unit G1 having a negative refractive power, an aperture stop S, a second lens unit G2 having a positive refractive power and a third lens unit G3 having a negative refractive power. When magnification change is performed from a wide-angle end to a telephoto end, the first lens unit G1 moves toward an image side. The aperture stop S and the second lens unit G2 integrally monotonously move toward the object side while reducing a space between the second lens unit G2 and the first lens unit G1. The third lens unit G3 moves toward the object side while enlarging a space between the third lens unit G3 and the second lens unit G2.

The first lens unit G1 is constituted of, in order from the object side, a negative meniscus lens whose convex surface faces the object side and a positive meniscus lens whose convex surface faces the object side. The second lens unit G2 is constituted of a cemented triplet including, in order from the object side, a double-convex positive lens, a negative meniscus lens whose convex surface faces the image side and a positive meniscus lens whose convex surface faces the image side. The third lens unit G3 is constituted of one double-concave negative lens. The aperture stop S is positioned on the image side of the vertex of the surface (the intersection of the surface and the optical axis) of the cemented triplet of the second lens unit G2 closest to the object side.

Aspherical surfaces are used on six surfaces including opposite surfaces of the positive meniscus lens of the first lens unit G1; the surfaces of the cemented triplet of the second lens unit G2 closest to the object side and the image side; and opposite surfaces of the double-concave negative lens of the third lens unit G3.

Figure 2A:
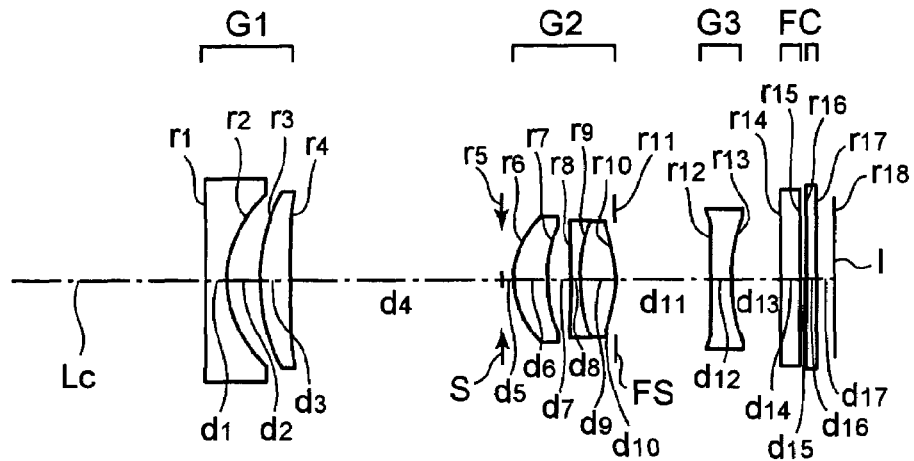
FIGS. 2A to 2C are sectional views of Example 2 of the present invention when focused on an infinite object.
Figure 2B:
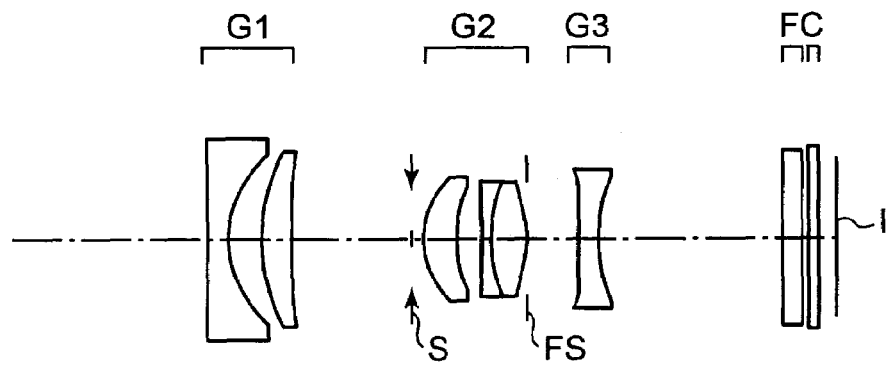
Figure 2C:
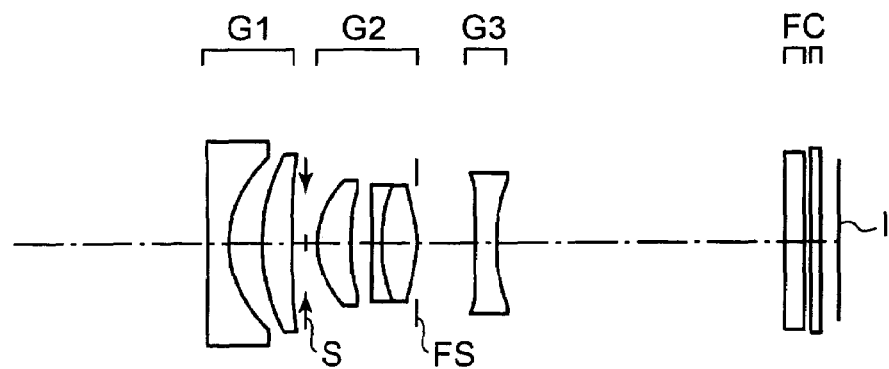

As shown in FIGS. 2A to 2C, Example 2 includes, in order from an object side, a first lens unit G1 having a negative refractive power, an aperture stop S, a second lens unit G2 having a positive refractive power and a third lens unit G3 having a negative refractive power. A flare stop FS is disposed at a position of the vertex of the surface of the second lens unit G2 closest to an image side. When magnification change is performed from a wide-angle end to a telephoto end, the first lens unit G1 slightly moves toward the object side along a locus concave toward the object side, and is arranged slightly closer to the object side in the telephoto end than in the wide-angle end. The aperture stop S and the second lens unit G2 integrally monotonously move toward the object side while reducing a space between the second lens unit G2 and the first lens unit G1. The third lens unit G3 moves toward the object side while once reducing a space between the third lens unit G3 and the second lens unit G2 and then enlarging the space.

The first lens unit G1 is constituted of, in order from the object side, a negative meniscus lens whose convex surface faces the object side and a positive meniscus lens whose convex surface faces the object side. The second lens unit G2 is constituted of, in order from the object side, a positive meniscus lens whose convex surface faces the object side and a cemented doublet including a double-concave negative lens and a double-convex positive lens. The third lens unit G3 is constituted of one negative meniscus lens whose convex surface faces the object side.

Aspherical surfaces are used on six surfaces including an image-side surface of the negative meniscus lens of the first lens unit G1; opposite surfaces of the positive meniscus lens of the second lens unit G2; the surface of the cemented doublet closest to the image side; and opposite surfaces of the negative meniscus lens of the third lens unit G3.

Figure 3A:
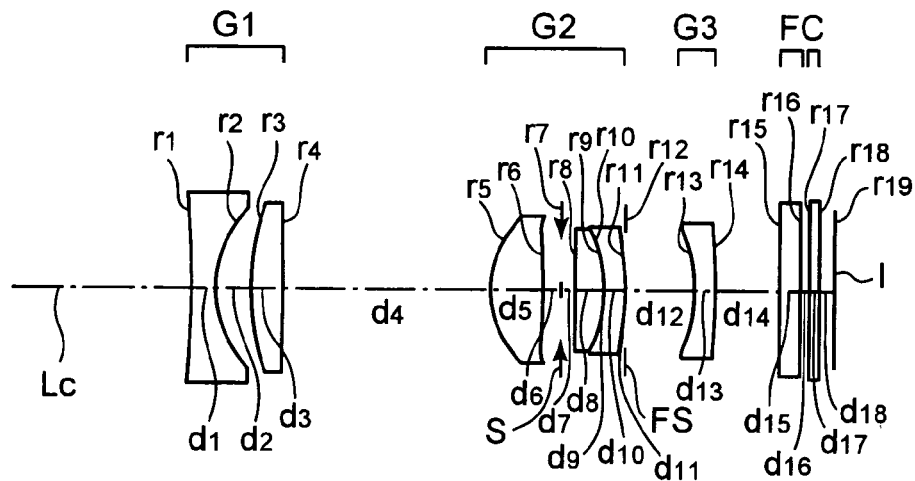
FIGS. 3A to 3C are sectional views of Example 3 of the present invention when focused on an infinite object.
Figure 3B:
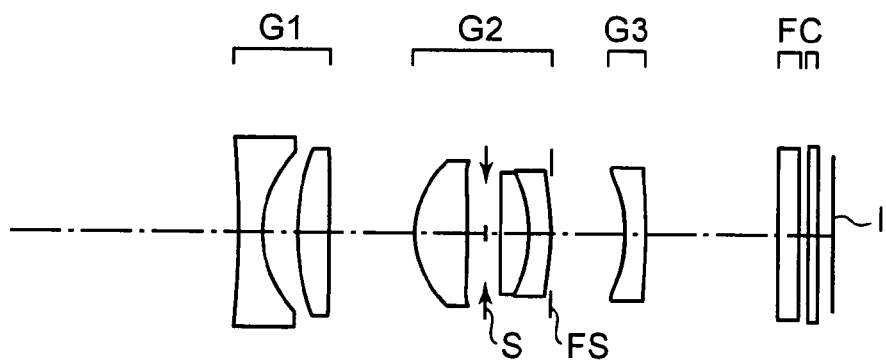
Figure 3C:
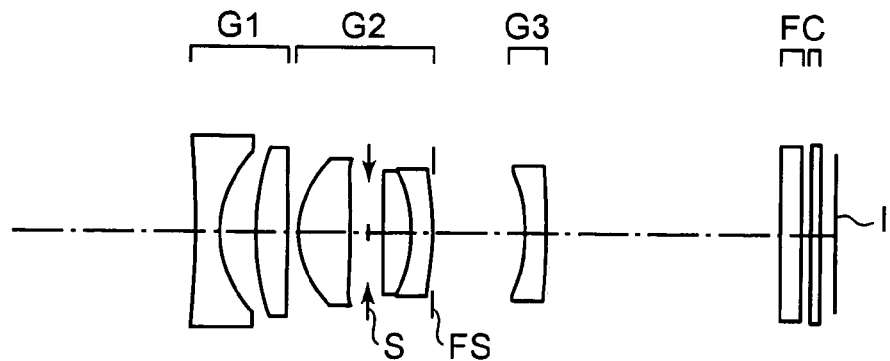

As shown in FIGS. 3A to 3C, Example 3 includes, in order from an object side, a first lens unit G1 having a negative refractive power, a second lens unit G2 having a positive refractive power and a third lens unit G3 having a negative refractive power. An aperture stop S is disposed integrally in the second lens unit G2, and a flare stop FS is disposed at a position of the vertex of the surface of the second lens unit G2 closest to an image side. When magnification change is performed from a wide-angle end to a telephoto end, the first lens unit G1 moves toward the object side along a locus concave toward the object side, and is arranged slightly closer to the image side in the telephoto end than in the wide-angle end. The second lens unit G2 including the aperture stop S integrally monotonously moves toward the object side while reducing a space between the second lens unit G2 and the first lens unit G1. The third lens unit G3 moves toward the object side while enlarging a space between the third lens unit G3 and the second lens unit G2.

The first lens unit G1 is constituted of, in order from the object side, a double-concave negative lens and a positive meniscus lens whose convex surface faces the object side. The second lens unit G2 is constituted of, in order from the object side, a double-convex positive lens, the aperture stop S and a cemented doublet including a positive meniscus lens whose convex surface faces the image side and a negative meniscus lens whose convex surface faces the image side. The third lens unit G3 is constituted of one double-concave negative lens.

Aspherical surfaces are used on six surfaces including an image-side surface of the double-concave negative lens of the first lens unit G1; opposite surfaces of a double-convex positive lens of the second lens unit G2; the surface of the cemented doublet closest to the image side; and opposite surfaces of the double-concave negative lens of the third lens unit.

Figure 4A:
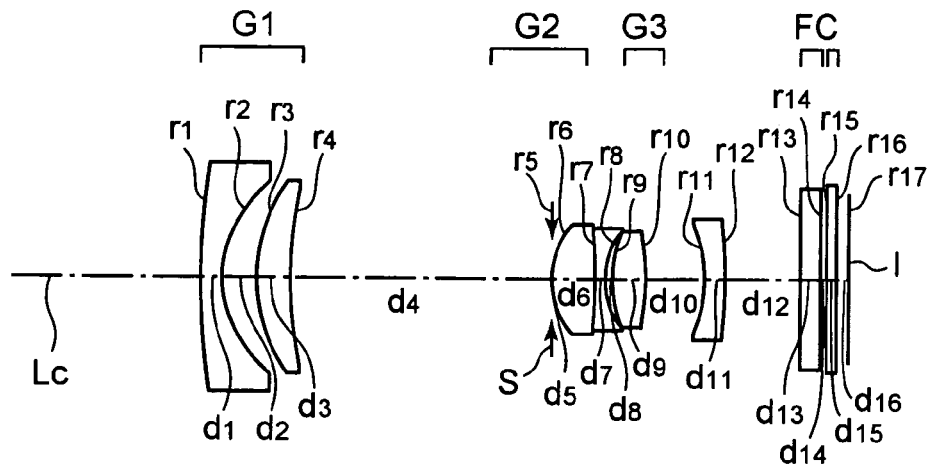
FIGS. 4A to 4C are sectional views of Example 4 of the present invention when focused on an infinite object.
Figure 4B:
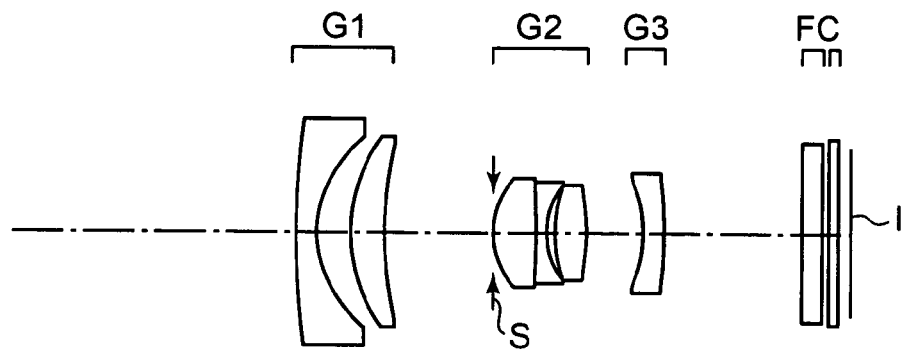
Figure 4C:
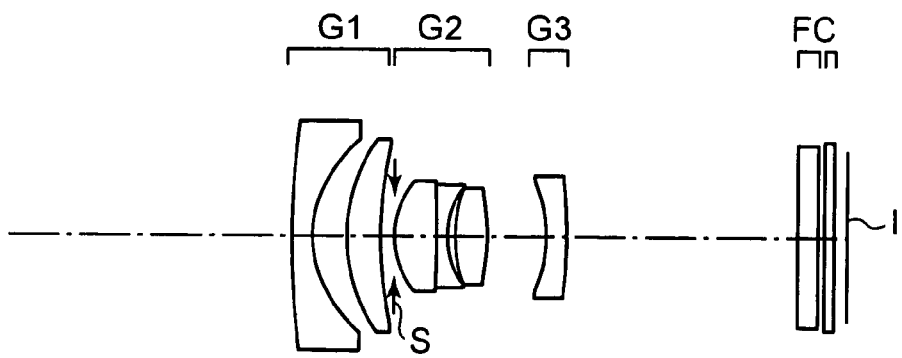

As shown in FIGS. 4A to 4C, Example 4 includes, in order from an object side, a first lens unit G1 having a negative refractive power, an aperture stop S, a second lens unit G2 having a positive refractive power and a third lens unit G3 having a negative refractive power. When magnification change is performed from a wide-angle end to a telephoto end, the first lens unit G1 moves toward the object side along a locus concave toward the object side, and is arranged closer to the object side in the telephoto end than in an intermediate state. The aperture stop S and the second lens unit G2 integrally monotonously move toward the object side while reducing a space between the second lens unit G2 and the first lens unit G1. The third lens unit G3 moves toward the object side while once reducing a space between the third lens unit G3 and the second lens unit G2 and then enlarging the space.

The first lens unit G1 is constituted of, in order from the object side, a negative meniscus lens whose convex surface faces the object side and a positive meniscus lens whose convex surface faces the object side. The second lens unit G2 is constituted of, in order from the object side, a cemented doublet including a double-convex positive lens and a double-concave negative lens, and a double-convex positive lens. The third lens unit G3 is constituted of one negative meniscus lens whose concave surface faces the object side.

Aspherical surfaces are used on three surfaces including an image-side surface of the negative meniscus lens of the first lens unit G1; the surface of the cemented doublet of the second lens unit G2 closest to the object side; and an object-side surface of the negative meniscus lens of the third lens unit G3.

Figure 5A:
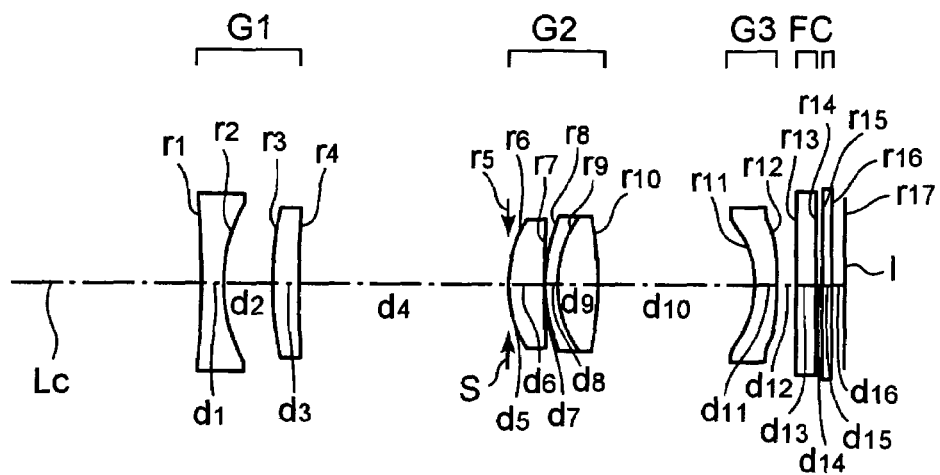
FIGS. 5A to 5C are sectional views of Example 5 of the present invention when focused on an infinite object.
Figure 5B:
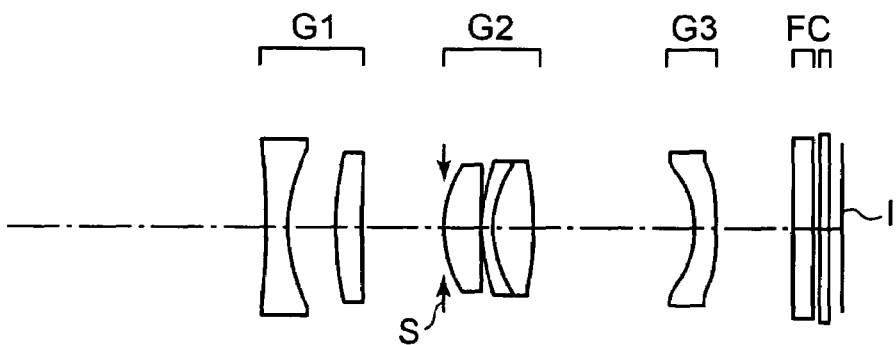
Figure 5C:
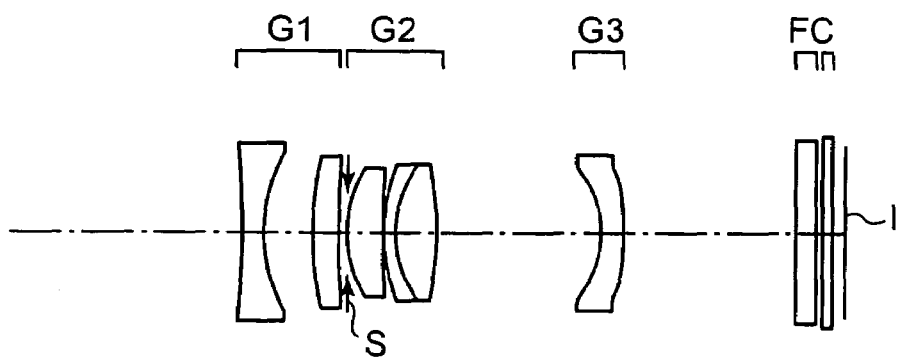

As shown in FIGS. 5A to 5C, Example 5 includes, in order from an object side, a first lens unit G1 having a negative refractive power, an aperture stop S, a second lens unit G2 having a positive refractive power and a third lens unit G3 having a negative refractive power. When magnification change is performed from a wide-angle end to a telephoto end, the first lens unit G1 moves toward the object side along a locus concave toward the object side, and is arranged closer to an image side in the telephoto end than in the wide-angle end. The aperture stop S and the second lens unit G2 integrally monotonously move toward the object side while reducing a space between the second lens unit G2 and the first lens unit G1. The third lens unit G3 moves toward the object side while enlarging a space between the third lens unit G3 and the second lens unit G2.

The first lens unit G1 is constituted of, in order from the object side, a double-concave negative lens and a positive meniscus lens whose convex surface faces the object side. The second lens unit G2 is constituted of, in order from the object side, a positive meniscus lens whose convex surface faces the object side and a cemented doublet including a negative meniscus lens whose convex surface faces the object side and a double-convex positive lens. The third lens unit G3 is constituted of one double-concave negative lens.

Aspherical surfaces are used on four surfaces including an image-side surface of the double-concave negative lens of the first lens unit G1; an object-side surface of the positive meniscus lens of the second lens unit G2; and opposite surfaces of the double-concave negative lens of the third lens unit G3.

Figure 6A:
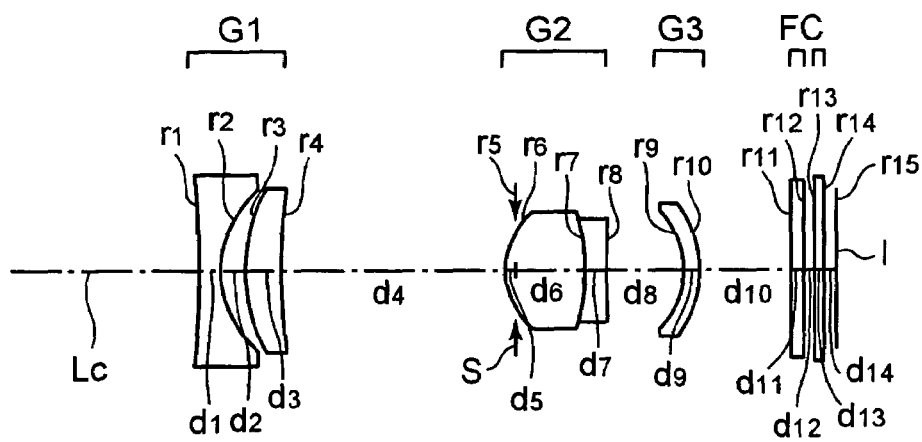
FIGS. 6A to 6C are sectional views of Example 6 of the present invention when focused on an infinite object.
Figure 6B:
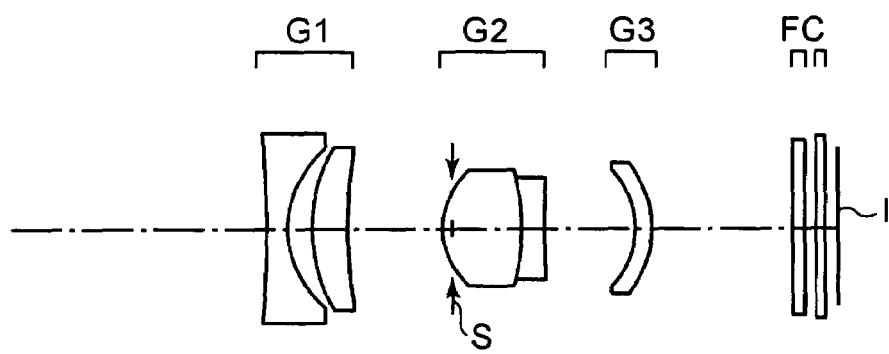
Figure 6C:
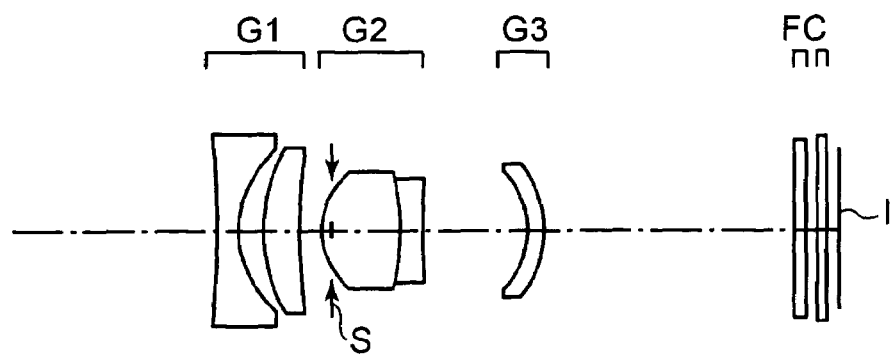

As shown in FIGS. 6A to 6C, Example 6 is constituted of, in order from an object side, a first lens unit G1 having a negative refractive power, an aperture stop S, a second lens unit G2 having a positive refractive power and a third lens unit G3 having a negative refractive power. When magnification change is performed from a wide-angle end to a telephoto end, the first lens unit G1 moves toward the object side along a locus concave toward the object side, and is positioned closer to an image side in the telephoto end than in the wide-angle end. The aperture stop S and the second lens unit G2 integrally monotonously move toward the object side while reducing a space between the second lens unit G2 and the first lens unit G1. The third lens unit G3 moves toward the object side while enlarging a space between the third lens unit G3 and the second lens unit G2.

The first lens unit G1 is constituted of, in order from the object side, a double-concave negative lens and a positive meniscus lens whose convex surface faces the object side. The second lens unit G2 is constituted of a cemented doublet including a double-convex positive lens and a negative meniscus lens whose concave surface faces the object side. The third lens unit G3 is constituted of one negative meniscus lens whose concave surface faces the object side. The aperture stop S is positioned on the image side of the vertex of the surface of the cemented doublet of the second lens unit G2 closest to the object side.

Aspherical surfaces are used on three surfaces including an image-side surface of the double-concave negative lens of the first lens unit G1; and the surfaces of the cemented doublet of the second lens unit G2 closest to the object side and the image side.

Figure 7A:
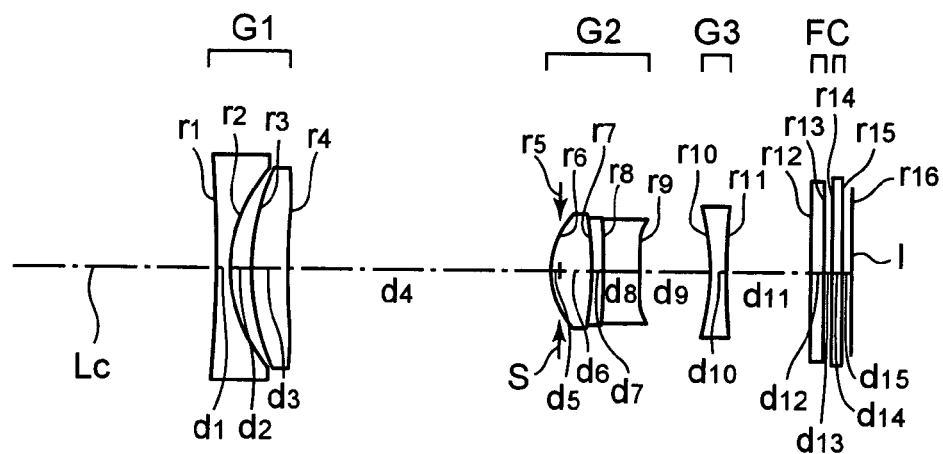
FIGS. 7A to 7C are sectional views of Example 7 of the present invention when focused on an infinite object.
Figure 7B:
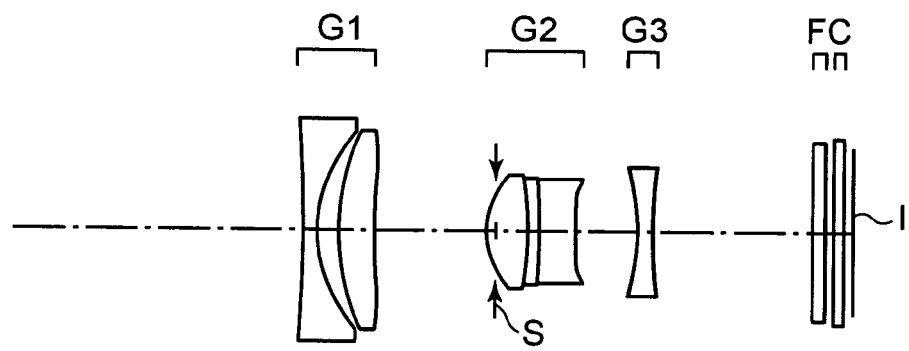
Figure 7C:
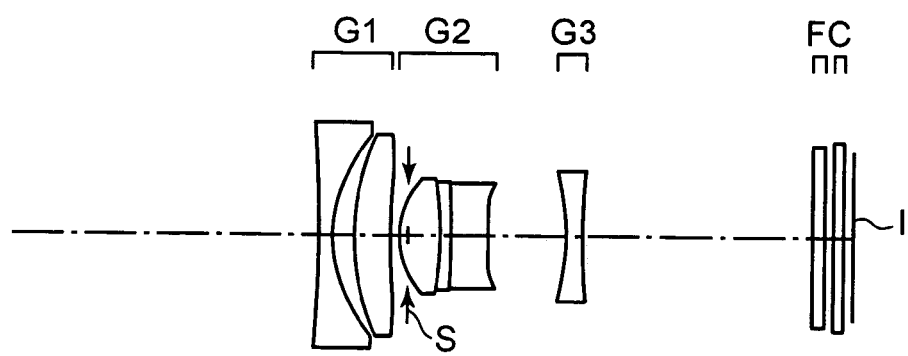

As shown in FIGS. 7A to 7C, Example 7 includes, in order from an object side, a first lens unit G1 having a negative refractive power, an aperture stop S, a second lens unit G2 having a positive refractive power and a third lens unit G3 having a negative refractive power. When magnification change is performed from a wide-angle end to a telephoto end, the first lens unit G1 moves toward an image side. The aperture stop S and the second lens unit G2 integrally monotonously move toward the object side while reducing a space between the second lens unit G2 and the first lens unit G1. The third lens unit G3 moves toward the object side while once reducing a space between the third lens unit G3 and the second lens unit G2 and then enlarging the space.

The first lens unit G1 is constituted of, in order from the object side, a double-concave negative lens and a positive meniscus lens whose convex surface faces the object side. The second lens unit G2 is constituted of a cemented triplet including, in order from the object side, a double-convex positive lens, a negative meniscus lens whose convex surface faces the image side and a negative meniscus lens whose convex surface faces the image side. The third lens unit G3 is constituted of one double-concave negative lens. The aperture stop S is positioned on the image side of the vertex of the surface of the cemented triplet of the second lens unit G2 closest to the object side.

Aspherical surfaces are used on six surfaces including opposite surfaces of the positive meniscus lens of the first lens unit G1; the surfaces of the cemented triplet of the second lens unit G2 closest to the object side and the image side; and opposite surfaces of the double-concave negative lens of the third lens unit G3.

Figure 8A:
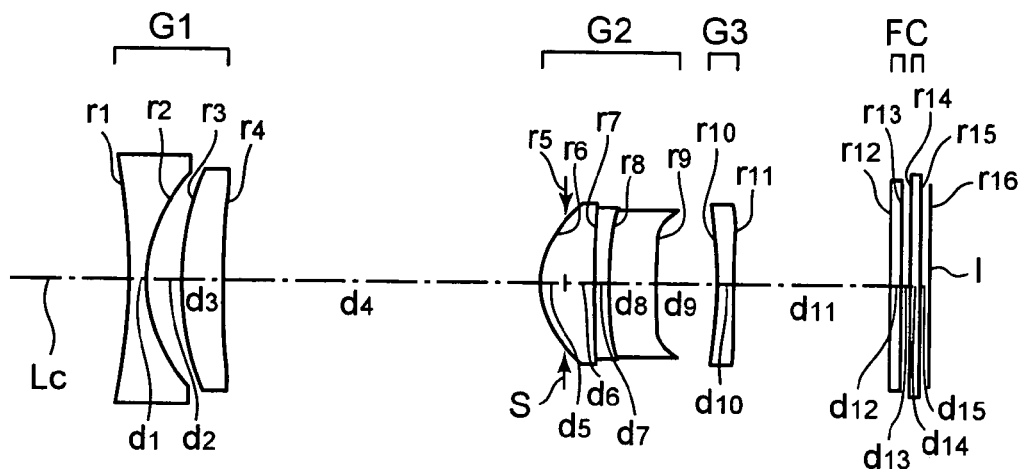
FIGS. 8A to 8C are sectional views of Example 8 of the present invention when focused on an infinite object.
Figure 8B:
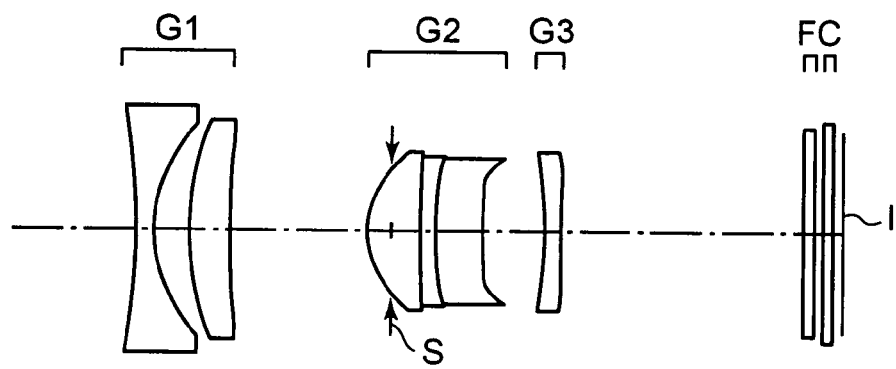
Figure 8C:
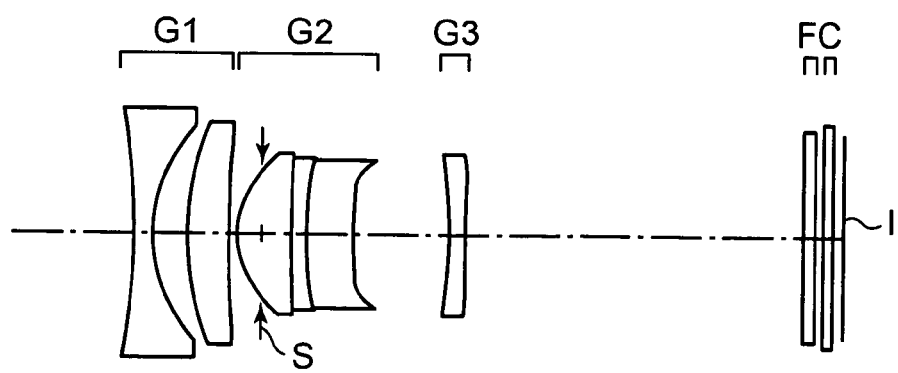
Figure 9A:
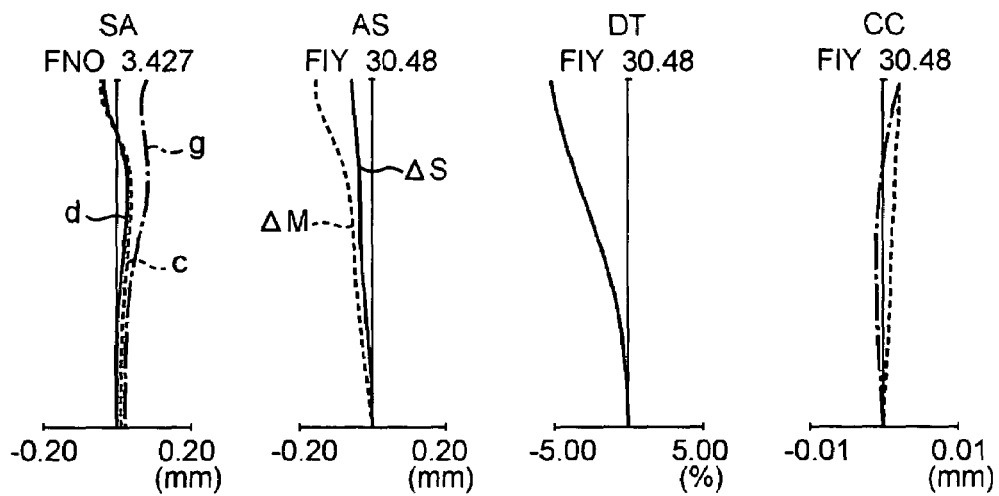
FIGS. 9A to 9C are aberration diagrams of Example 1 when focused on the infinite object.
Figure 9B:
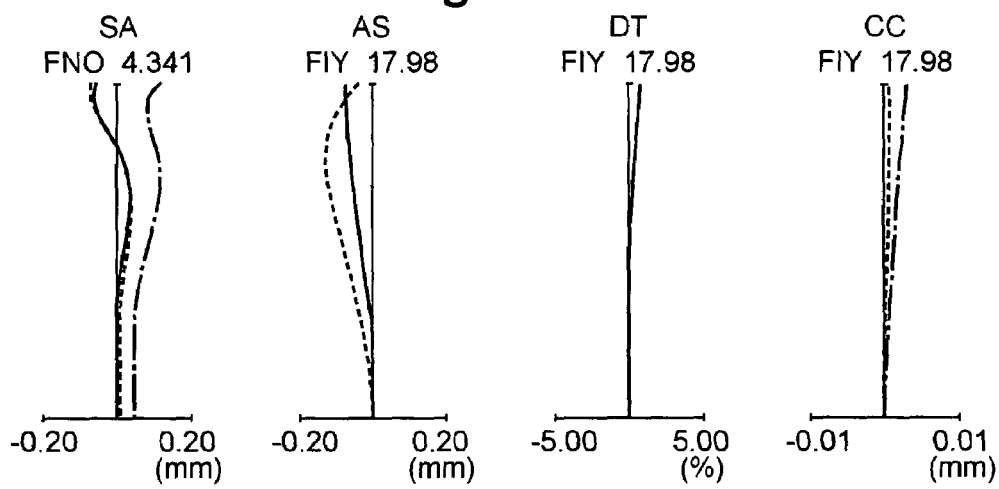
Figure 9C:
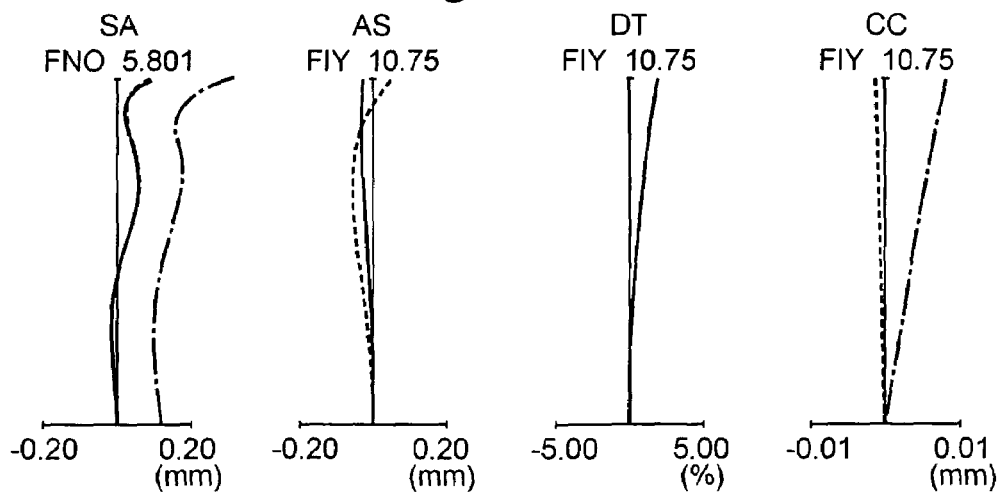
Figure 10A:
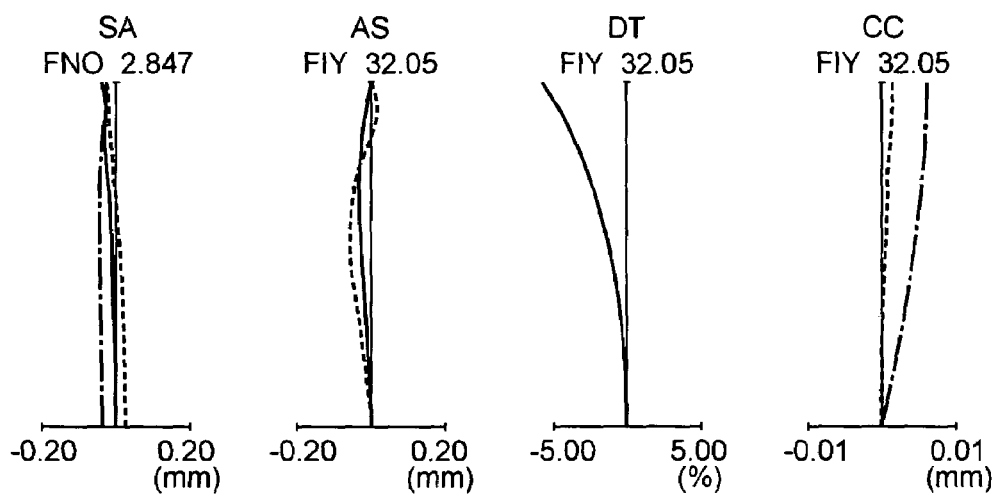
FIGS. 10A to 10C are aberration diagrams of Example 2 when focused on the infinite object.
Figure 10B:
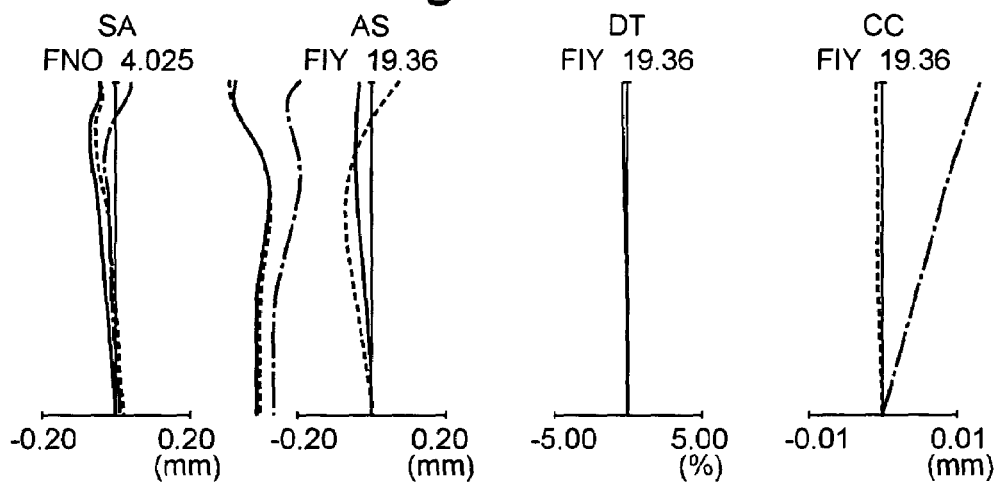
Figure 10C:
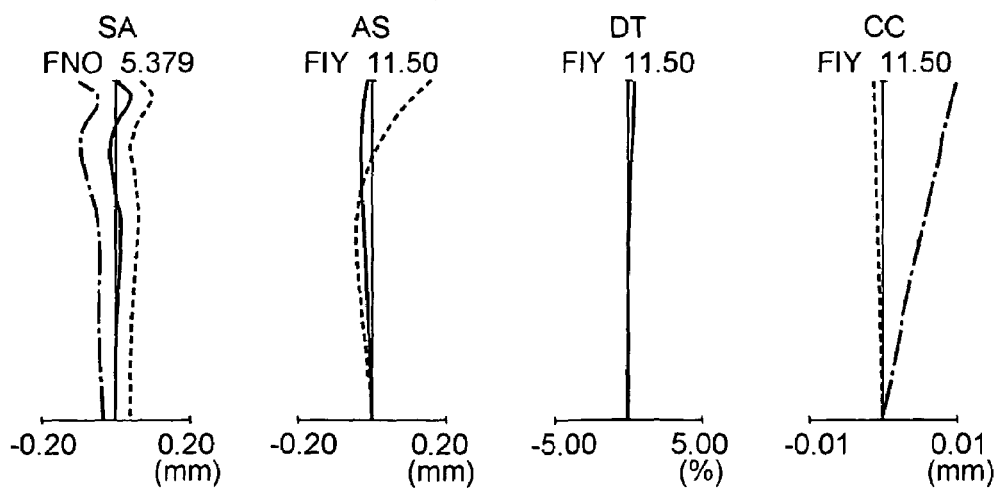
Figure 11A:
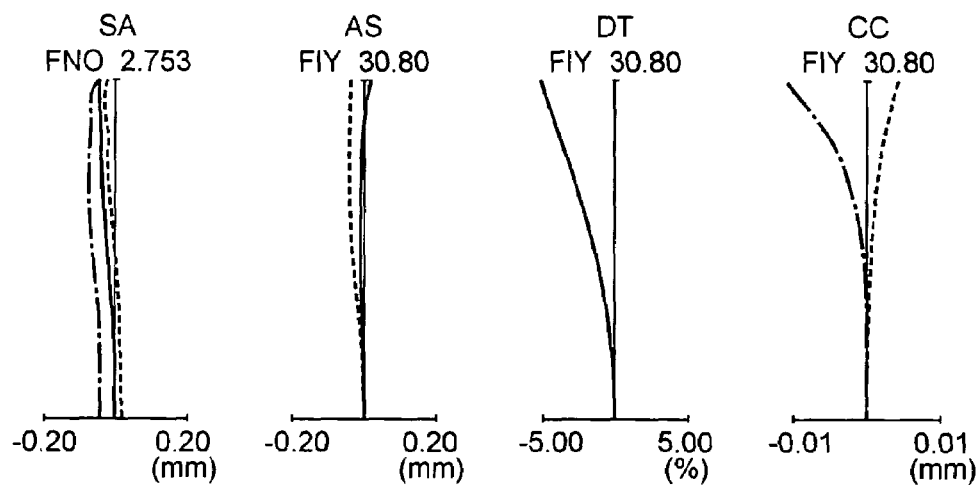
FIGS. 11A to 11C are aberration diagrams of Example 3 when focused on the infinite object.
Figure 11B:
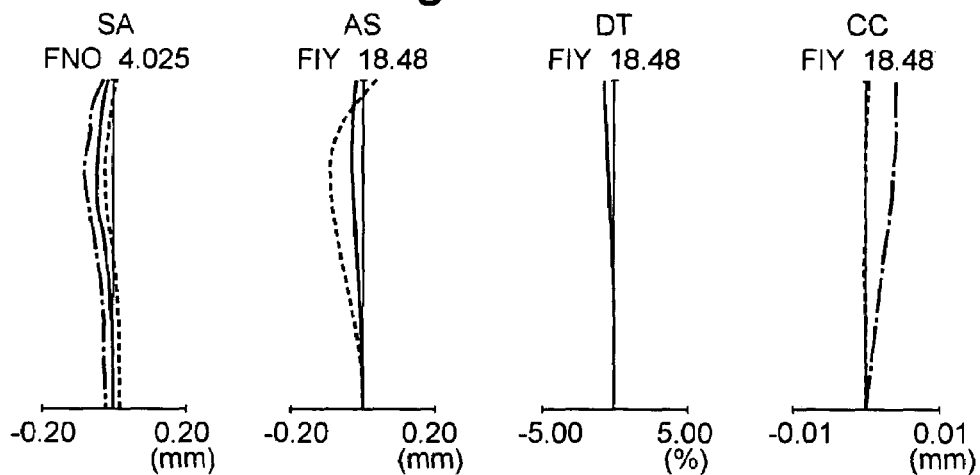
Figure 11C:
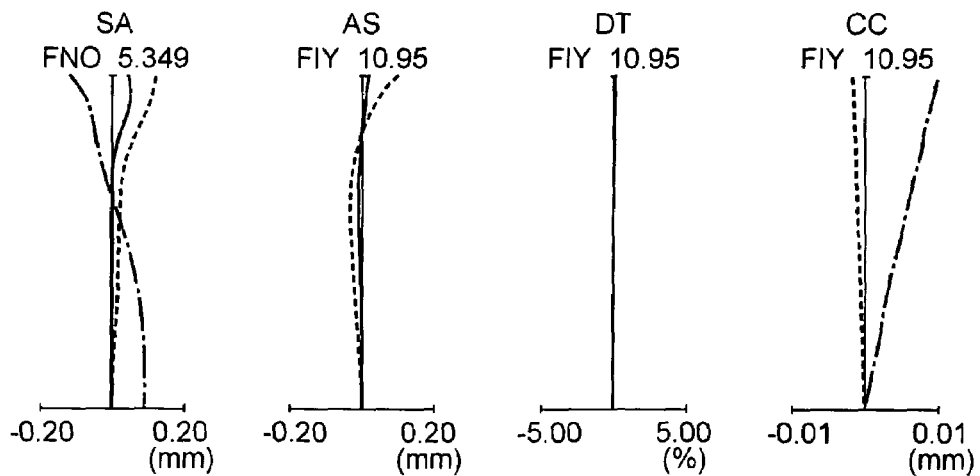
Figure 12A:
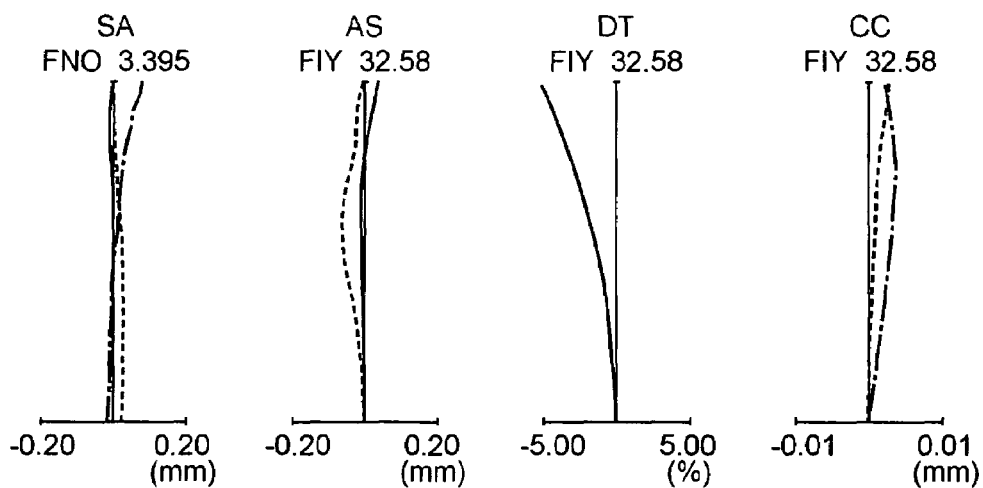
FIGS. 12A to 12C are aberration diagrams of Example 4 when focused on the infinite object.
Figure 12B:
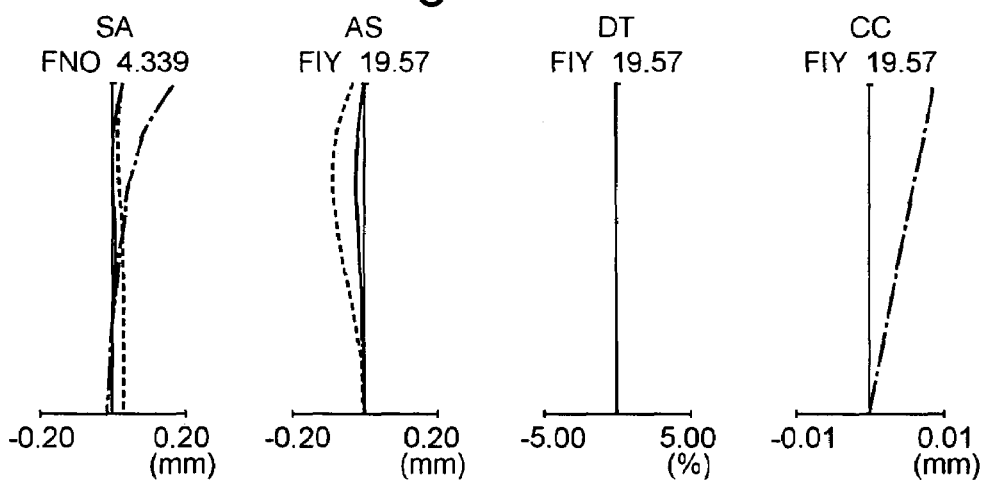
Figure 12C:
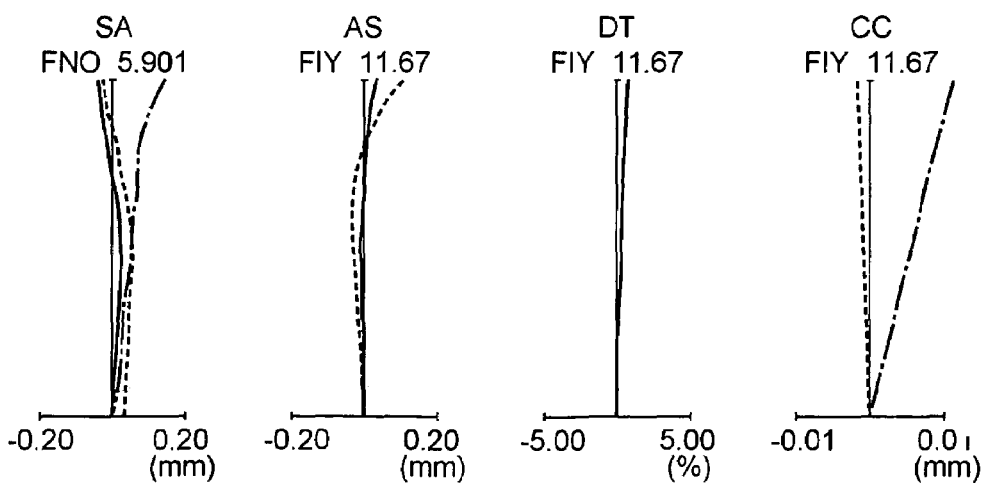
Figure 13A:
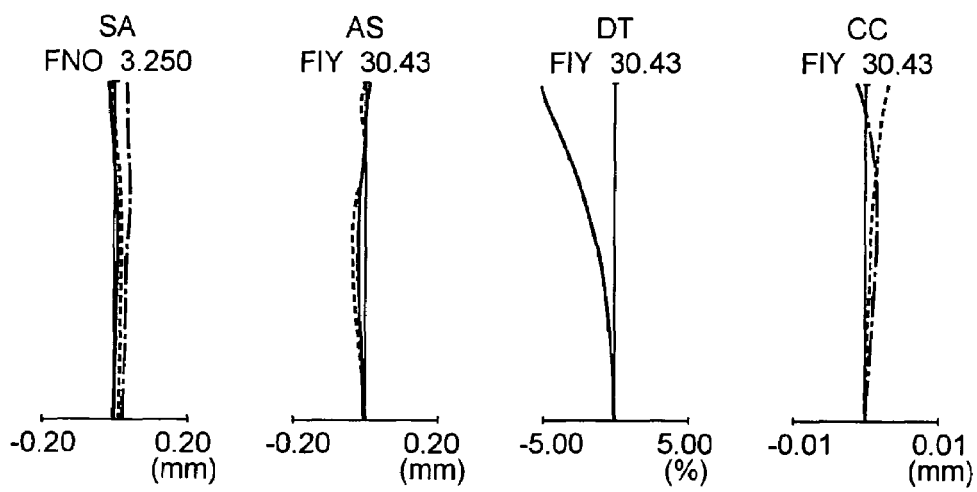
FIGS. 13A to 13C are aberration diagrams of Example 5 when focused on the infinite object.
Figure 13B:
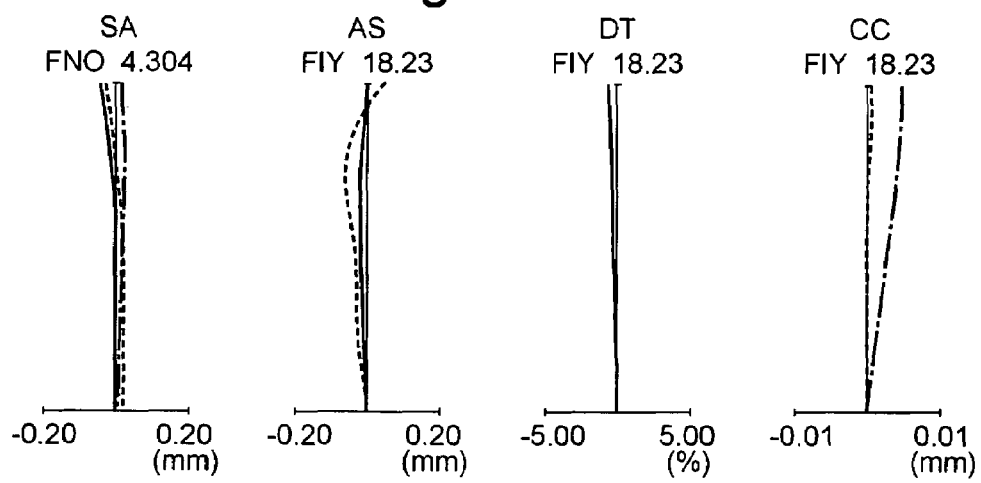
Figure 13C:
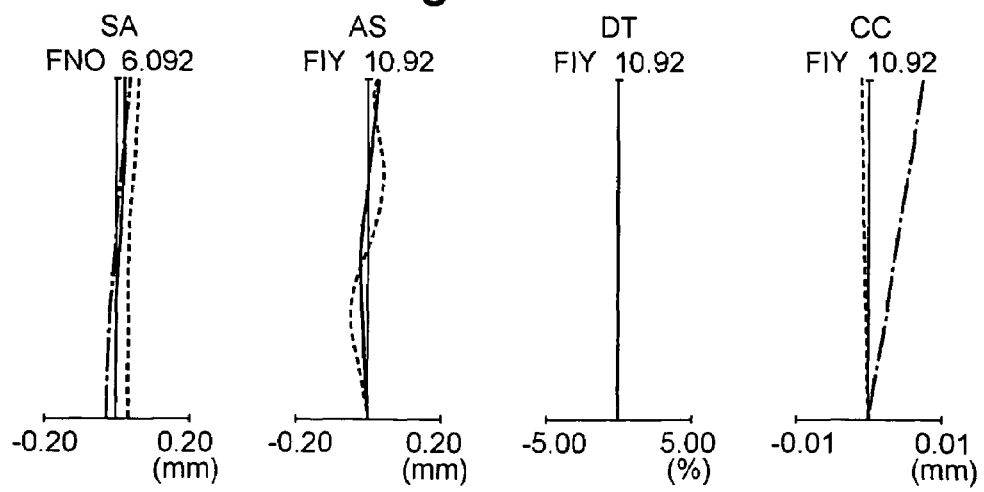
Figure 14A:
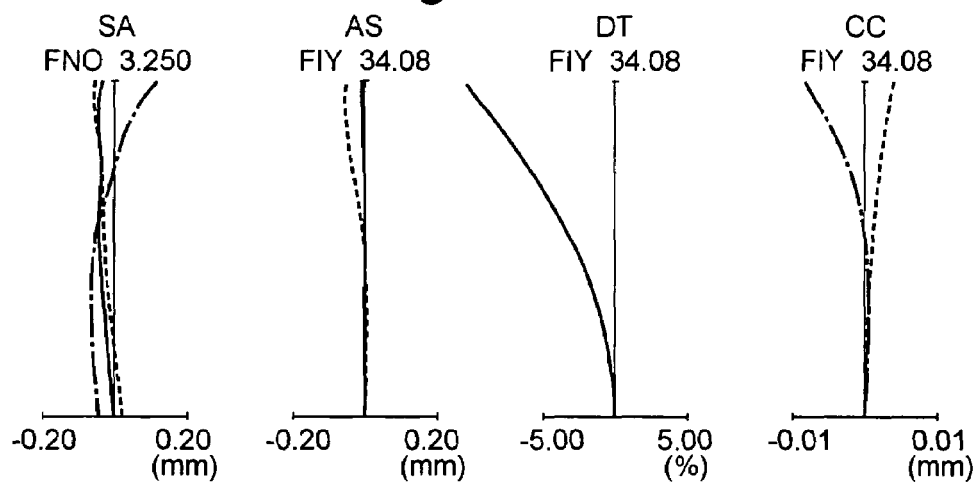
FIGS. 14A to 14C are aberration diagrams of Example 6 when focused on the infinite object.
Figure 14B:
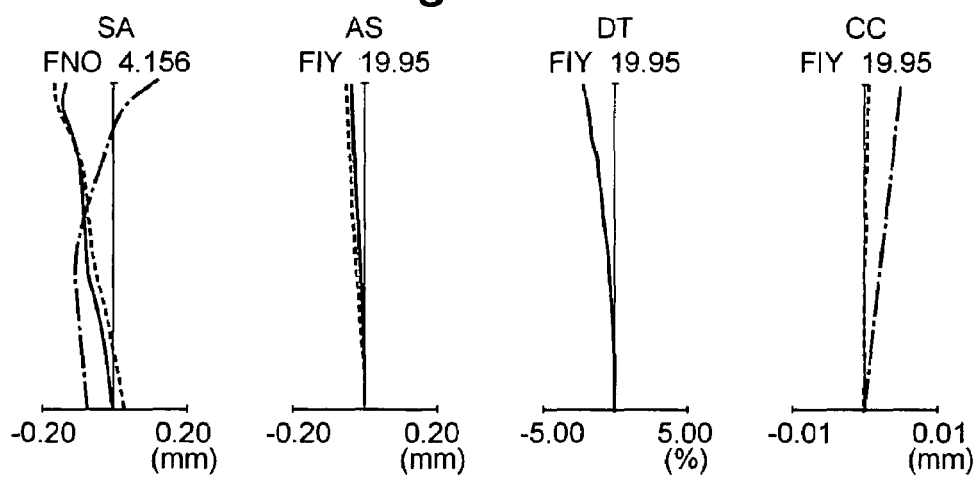
Figure 14C:
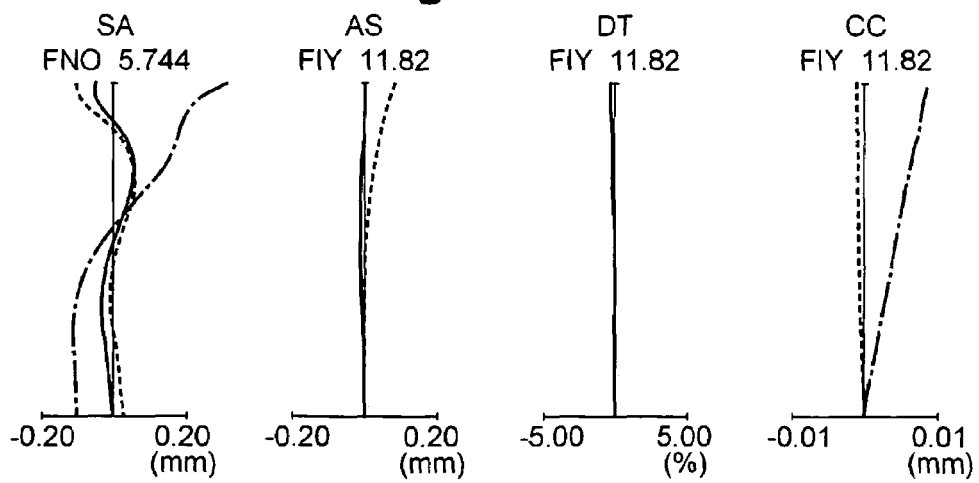
Figure 15A:
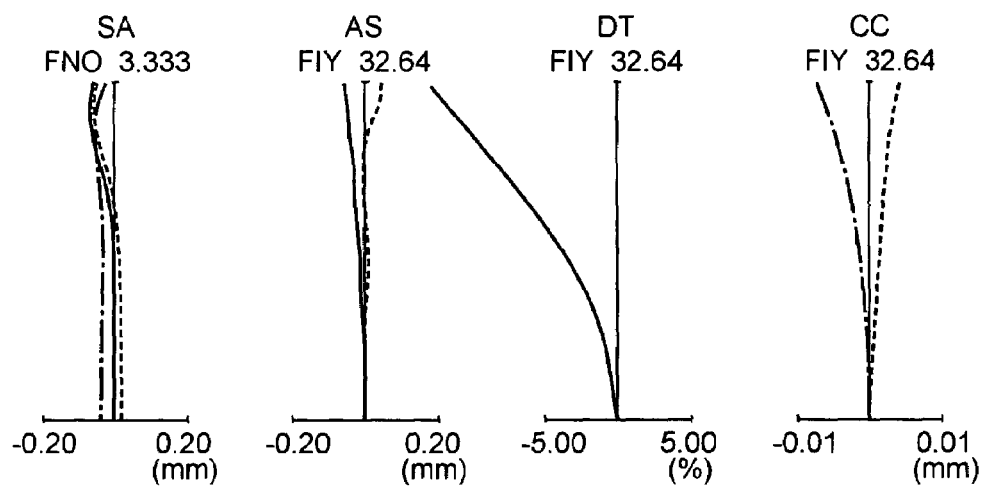
FIGS. 15A to 15C are aberration diagrams of Example 7 when focused on the infinite object.
Figure 15B:
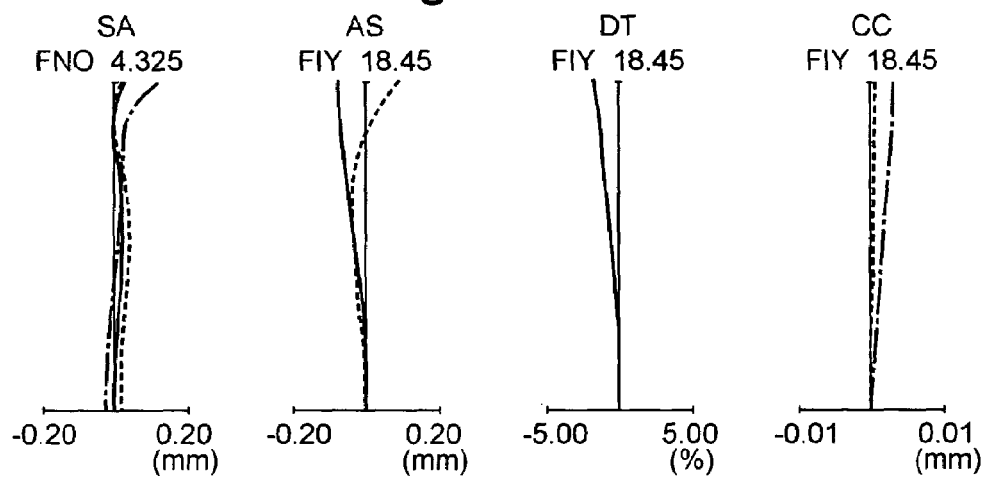
Figure 15C:
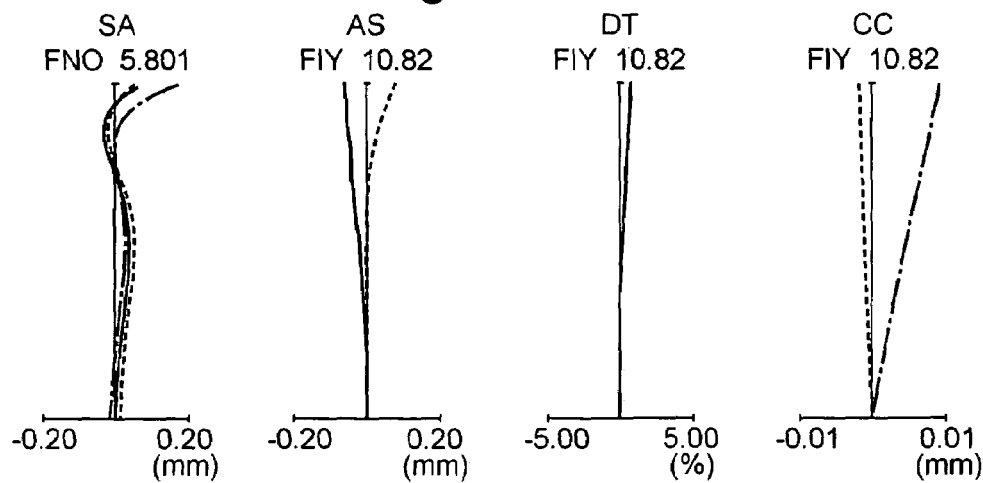
Figure 16A:
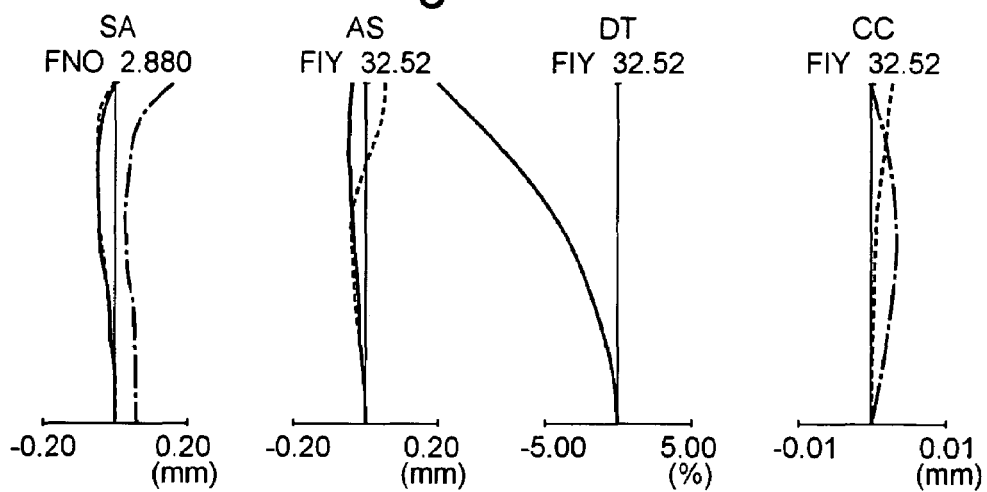
FIGS. 16A to 16C are aberration diagrams of Example 8 when focused on the infinite object.
Figure 16B:
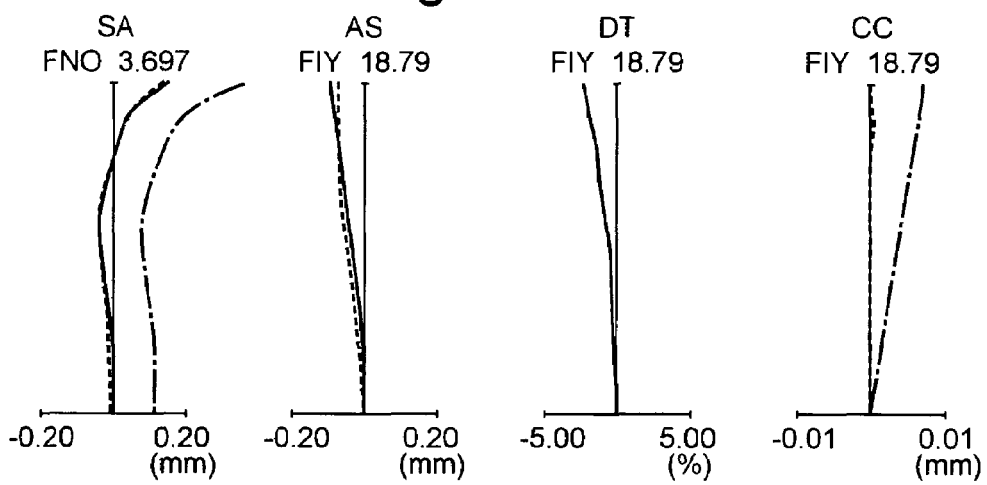
Figure 16C:
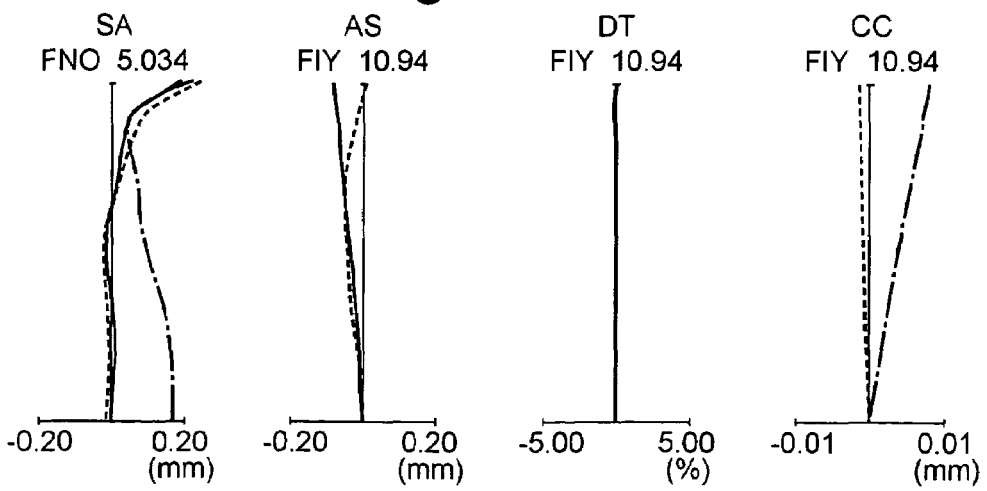

As shown in FIGS. 8A to 8C, Example 8 is constituted of, in order from an object side, a first lens unit G1 having a negative refractive power, an aperture stop S, a second lens unit G2 having a positive refractive power and a third lens unit G3 having a negative refractive power. When magnification change is performed from a wide-angle end to a telephoto end, the first lens unit G1 moves toward an image side. The aperture stop S and the second lens unit G2 integrally monotonously move toward the object side while reducing a space between the second lens unit G2 and the first lens unit G1. The third lens unit G3 moves toward the object side while once reducing a space between the third lens unit G3 and the second lens unit G2 and then enlarging the space.

The first lens unit G1 is constituted of, in order from the object side, a double-concave negative lens and a positive meniscus lens whose convex surface faces the object side. The second lens unit G2 is constituted of a cemented triplet including, in order from the object side, a positive meniscus lens whose convex surface faces the object side, a negative meniscus lens whose convex surface faces the object side and a double-convex positive lens. The third lens unit G3 is constituted of one double-concave negative lens. The aperture stop S is positioned on the image side of the vertex of the surface of the cemented triplet of the second lens unit G2 closest to the object side.

Aspherical surfaces are used on five surfaces including an image-side surface of the double-concave negative lens of the first lens unit G1; the surfaces of the cemented triplet of the second lens unit G2 closest to the object side and the image side; and opposite surfaces of the double-concave negative lens of the third lens unit G3.

It is to be noted that in any of the above examples, focusing is performed by movement of the third lens unit G3.

There will be described hereinafter numerical data of the above examples. In addition to the above-described symbols, f is a focal length of the zoom lens system, $F_{NO}$ is the F-number, $2\omega$ is an angle of field, WE is the wide-angle end, ST is the intermediate state, TE is the telephoto end, $r_1, r_2 \ldots$ are paraxial radii of curvatures of the lens surfaces, $d_1, d_2 \ldots$ are spaces between the lens surfaces, $n_{d1}, n_{d2} \ldots$ are refractive indices of the lenses for the wavelength of d-line, and $V_{d1}, V_{d2} \ldots$ are the Abbe numbers of the lenses. It is to be noted that (AS) after the data of the paraxial radius of curvature indicates that the surface is an aspherical surface, (S) indicates that the surface is an aperture stop surface, (FS) indicates that the surface is a flare stop surface, and (I) indicates that the surface is an image surface. The shape of the aspherical surface is represented by the following equation in a coordinate system in which the intersection of the aspherical surface and the optical axis is set as an origin, the optical axis is set as an x-axis whose positive direction is coincide with the light traveling direction, and an arbitrary axis which passes the origin and is perpendicular to the x-axis is set as a y-axis:

$$x=(y^2/r)/[1+\{1-(K+1)(y/r)^2\}^{1/2}]+A_4 y^4+A_6 y^6+A_8 y^8+A_{10} y^{10}+A_{12} y^{12},$$

wherein r is a paraxial radius of curvature, K is a conic constant, and $A_4, A_6, A_8, A_{10}$ and $A_{12}$ are 4-th, 6-th, 8-th, 10-th, 12-th order aspherical surface coefficients.

Numerical Example 1

| | | | |
|---|---|---|---|
| $r_1 = 51.789$ | $d_1 = 0.70$ | $n_{d1} = 1.88300$ | $V_{d1} = 40.76$ |
| $r_2 = 5.837$ | $d_2 = 1.71$ | | |
| $r_3 = 13.554$(AS) | $d_3 = 1.47$ | $n_{d2} = 1.82114$ | $V_{d2} = 24.06$ |
| $r_4 = 75.183$(AS) | $d_4 =$ variable | | |
| $r_5 = \infty$ (S) | $d_5 = -0.72$ | | |
| $r_6 = 3.826$(AS) | $d_6 = 3.00$ | $n_{d3} = 1.49700$ | $V_{d3} = 81.54$ |
| $r_7 = -19.669$ | $d_7 = 0.50$ | $n_{d4} = 1.92286$ | $V_{d4} = 18.90$ |
| $r_8 = -133.221$ | $d_8 = 1.09$ | $n_{d5} = 1.69350$ | $V_{d5} = 53.21$ |
| $r_9 = -23.946$(AS) | $d_9 =$ variable | | |
| $r_{10} = -68.471$(AS) | $d_{10} = 0.80$ | $n_{d6} = 1.52542$ | $V_{d6} = 55.78$ |
| $r_{11} = 7.284$(AS) | $d_{11} =$ variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.41$ | | |
| $r_{16} = \infty$ (I) | | | |

TABLE 1-1

Aspherical Surface Coefficient

| | 3rd surface | 4th surface | 6th surface | 9th surface |
|---|---|---|---|---|
| K | 0.000 | 0.000 | 0.000 | 0.000 |
| $A_4$ | $-2.90406 \times 10^{-4}$ | $-6.25636 \times 10^{-4}$ | $-3.84634 \times 10^{-4}$ | $3.29823 \times 10^{-3}$ |
| $A_6$ | $-2.19067 \times 10^{-5}$ | $-1.55735 \times 10^{-5}$ | $-1.86499 \times 10^{-5}$ | $2.17032 \times 10^{-4}$ |

TABLE 1-1-continued

Aspherical Surface Coefficient

| | 3rd surface | 4th surface | 6th surface | 9th surface |
|---|---|---|---|---|
| $A_8$ | $1.93834 \times 10^{-6}$ | $1.40541 \times 10^{-6}$ | $9.97230 \times 10^{-6}$ | $-1.07505 \times 10^{-5}$ |
| $A_{10}$ | $-3.55926 \times 10^{-8}$ | $-3.74784 \times 10^{-8}$ | $-5.98509 \times 10^{-7}$ | $8.77866 \times 10^{-6}$ |
| $A_{12}$ | 0 | 0 | 0 | 0 |

TABLE 1-2

| | 10th surface | 11th surface |
|---|---|---|
| K | 0.000 | 0.000 |
| $A_4$ | $9.19324 \times 10^{-4}$ | $1.04459 \times 10^{-3}$ |
| $A_6$ | $-7.15668 \times 10^{-4}$ | $-5.99256 \times 10^{-4}$ |
| $A_8$ | $2.38646 \times 10^{-4}$ | $2.45269 \times 10^{-4}$ |
| $A_{10}$ | $-2.14848 \times 10^{-5}$ | $-2.50329 \times 10^{-5}$ |
| $A_{12}$ | 0 | 0 |

TABLE 2

Zoom Data ($\infty$)

| | WE | ST | TE |
|---|---|---|---|
| f (mm) | 6.80 | 11.62 | 19.67 |
| $F_{NO}$ | 3.43 | 4.34 | 5.81 |
| $2\omega(°)$ | 60.95 | 35.96 | 21.49 |
| $d_4$ | 14.53 | 6.17 | 1.12 |
| $d_9$ | 1.97 | 2.41 | 3.21 |
| $d_{11}$ | 5.80 | 8.08 | 11.34 |

Numerical Example 2

| | | | |
|---|---|---|---|
| $r_1 = 306.956$ | $d_1 = 1.10$ | $n_{d1} = 1.88300$ | $V_{d1} = 40.76$ |
| $r_2 = 5.040$(AS) | $d_2 = 1.54$ | | |
| $r_3 = 9.556$ | $d_3 = 1.50$ | $n_{d2} = 2.00069$ | $V_{d2} = 25.46$ |
| $r_4 = 36.055$ | $d_4 =$ variable | | |
| $r_5 = \infty$ (S) | $d_5 = 0.60$ | | |
| $r_6 = 3.999$(AS) | $d_6 = 1.60$ | $n_{d3} = 1.49700$ | $V_{d3} = 81.54$ |
| $r_7 = 10.418$(AS) | $d_7 = 1.01$ | | |
| $r_8 = -2200.101$ | $d_8 = 0.50$ | $n_{d4} = 1.69895$ | $V_{d4} = 30.13$ |
| $r_9 = 6.879$ | $d_9 = 1.70$ | $n_{d5} = 1.51633$ | $V_{d5} = 64.14$ |
| $r_{10} = -5.827$(AS) | $d_{10} = 0.00$ | | |
| $r_{11} = \infty$ (FS) | $d_{11} =$ variable | | |
| $r_{12} = 182.020$(AS) | $d_{12} = 1.00$ | $n_{d6} = 1.52542$ | $V_{d6} = 55.78$ |
| $r_{13} = 7.466$(AS) | $d_{13} =$ variable | | |
| $r_{14} = \infty$ | $d_{14} = 0.86$ | $n_{d7} = 1.53996$ | $V_{d7} = 59.45$ |
| $r_{15} = \infty$ | $d_{15} = 0.27$ | | |
| $r_{16} = \infty$ | $d_{16} = 0.50$ | $n_{d8} = 1.51633$ | $V_{d8} = 64.14$ |
| $r_{17} = \infty$ | $d_{17} = 0.74$ | | |
| $r_{18} = \infty$ (I) | | | |

TABLE 3-1

Aspherical Surface Coefficient

| | 2nd surface | 6th surface | 7th surface | 10th surface |
|---|---|---|---|---|
| K | 0.000 | 0.000 | 0.000 | 0.000 |
| $A_4$ | $-7.03161 \times 10^{-4}$ | $8.07726 \times 10^{-5}$ | $2.23577 \times 10^{-3}$ | $2.01317 \times 10^{-3}$ |
| $A_6$ | $-1.50900 \times 10^{-5}$ | $-2.79067 \times 10^{-5}$ | $5.35251 \times 10^{-5}$ | $9.85069 \times 10^{-6}$ |
| $A_8$ | $-4.72408 \times 10^{-7}$ | $-5.24419 \times 10^{-6}$ | $-4.17537 \times 10^{-5}$ | $2.29412 \times 10^{-5}$ |

TABLE 3-1-continued

Aspherical Surface Coefficient

| | 2nd surface | 6th surface | 7th surface | 10th surface |
|---|---|---|---|---|
| $A_{10}$ | $1.39511 \times 10^{-8}$ | $-7.44347 \times 10^{-7}$ | $6.40628 \times 10^{-7}$ | $7.01191 \times 10^{-7}$ |
| $A_{12}$ | $-1.68860 \times 10^{-9}$ | $-1.72418 \times 10^{-9}$ | 0 | $1.23038 \times 10^{-9}$ |

TABLE 3-2

| | 12th surface | 13th surface |
|---|---|---|
| K | 0.000 | 0.000 |
| $A_4$ | $-6.60735 \times 10^{-4}$ | $-1.52561 \times 10^{-3}$ |
| $A_6$ | $1.64911 \times 10^{-4}$ | $3.41457 \times 10^{-4}$ |
| $A_8$ | $-1.96216 \times 10^{-5}$ | $-4.41343 \times 10^{-5}$ |
| $A_{10}$ | $-2.96844 \times 10^{-7}$ | $1.68548 \times 10^{-6}$ |
| $A_{12}$ | 0 | $-6.81757 \times 10^{-8}$ |

TABLE 4

Zoom Data (∞)

| | WE | ST | TE |
|---|---|---|---|
| f (mm) | 6.45 | 10.85 | 18.59 |
| $F_{NO}$ | 2.85 | 4.03 | 5.38 |
| 2ω(°) | 64.11 | 38.72 | 23.01 |
| $d_4$ | 10.18 | 5.76 | 0.60 |
| $d_{11}$ | 4.55 | 2.45 | 2.70 |
| $d_{13}$ | 2.51 | 8.98 | 14.03 |

Numerical Example 3

| | | | |
|---|---|---|---|
| $r_1 = -50.516$ | $d_1 = 1.10$ | $n_{d1} = 1.88300$ | $V_{d1} = 40.76$ |
| $r_2 = 4.872(AS)$ | $d_2 = 1.69$ | | |
| $r_3 = 12.456$ | $d_3 = 1.53$ | $n_{d2} = 2.00330$ | $V_{d2} = 28.27$ |
| $r_4 = 299.317$ | $d_4 = $ variable | | |
| $r_5 = 4.767(AS)$ | $d_5 = 2.50$ | $n_{d3} = 1.49700$ | $V_{d3} = 81.54$ |
| $r_6 = -23.383(AS)$ | $d_6 = 0.80$ | | |
| $r_7 = \infty$ (S) | $d_7 = 0.70$ | | |
| $r_8 = -251.090$ | $d_8 = 1.36$ | $n_{d4} = 1.49700$ | $V_{d4} = 81.54$ |
| $r_9 = -6.640$ | $d_9 = 0.00$ | $n_{d5} = 1.56384$ | $V_{d5} = 60.67$ |
| $r_{10} = -6.640$ | $d_{10} = 1.00$ | $n_{d6} = 1.84666$ | $V_{d6} = 23.78$ |
| $r_{11} = -13.664(AS)$ | $d_{11} = 0.00$ | | |
| $r_{12} = \infty$ (FS) | $d_{12} = $ variable | | |
| $r_{13} = -12.713(AS)$ | $d_{13} = 1.00$ | $n_{d7} = 1.52542$ | $V_{d6} = 55.78$ |
| $r_{14} = 47.649(AS)$ | $d_{14} = $ variable | | |
| $r_{15} = \infty$ | $d_{15} = 0.86$ | $n_{d8} = 1.53996$ | $V_{d7} = 59.45$ |
| $r_{16} = \infty$ | $d_{16} = 0.27$ | | |
| $r_{17} = \infty$ | $d_{17} = 0.50$ | $n_{d9} = 1.51633$ | $V_{d8} = 64.14$ |
| $r_{18} = \infty$ | $d_{18} = 0.77$ | | |
| $r_{19} = \infty$ (I) | | | |

TABLE 5-1

Aspherical Surface Coefficient

| | 2nd surface | 5th surface | 6th surface | 11th surface |
|---|---|---|---|---|
| K | 0.000 | 0.000 | 0.000 | 0.000 |
| $A_4$ | $-1.04343 \times 10^{-3}$ | $-1.51065 \times 10^{-4}$ | $1.46778 \times 10^{-3}$ | $-3.61264 \times 10^{-4}$ |
| $A_6$ | $-2.51465 \times 10^{-5}$ | $4.79803 \times 10^{-5}$ | $5.42225 \times 10^{-5}$ | $8.07394 \times 10^{-5}$ |
| $A_8$ | $-6.26331 \times 10^{-7}$ | $-6.32793 \times 10^{-6}$ | $-7.35672 \times 10^{-6}$ | $4.24932 \times 10^{-7}$ |

TABLE 5-1-continued

Aspherical Surface Coefficient

| | 2nd surface | 5th surface | 6th surface | 11th surface |
|---|---|---|---|---|
| $A_{10}$ | $-3.99303 \times 10^{-8}$ | $5.41763 \times 10^{-7}$ | $7.53422 \times 10^{-7}$ | $3.94107 \times 10^{-7}$ |
| $A_{12}$ | 0 | $2.13687 \times 10^{-9}$ | $1.09982 \times 10^{-8}$ | $-4.22648 \times 10^{-9}$ |

TABLE 5-2

| | 13th surface | 14th surface |
|---|---|---|
| K | 0.000 | $-0.108$ |
| $A_4$ | $-1.07590 \times 10^{-2}$ | $-8.13654 \times 10^{-3}$ |
| $A_6$ | $5.22891 \times 10^{-4}$ | $7.41557 \times 10^{-4}$ |
| $A_8$ | $4.57252 \times 10^{-5}$ | $-3.42831 \times 10^{-6}$ |
| $A_{10}$ | $-6.88479 \times 10^{-7}$ | $-6.60356 \times 10^{-10}$ |
| $A_{12}$ | 0 | 0 |

TABLE 6

Zoom Data (∞)

| | WE | ST | TE |
|---|---|---|---|
| f (mm) | 6.35 | 10.85 | 18.59 |
| $F_{NO}$ | 2.75 | 3.71 | 5.35 |
| 2ω(°) | 61.60 | 36.96 | 21.90 |
| $d_4$ | 9.90 | 4.00 | 0.49 |
| $d_{12}$ | 3.30 | 3.68 | 4.28 |
| $d_{14}$ | 3.25 | 6.33 | 11.43 |

Numerical Example 4

| | | | |
|---|---|---|---|
| $r_1 = 35.218$ | $d_1 = 1.00$ | $n_{d1} = 1.88300$ | $V_{d1} = 40.76$ |
| $r_2 = 5.195(AS)$ | $d_2 = 1.60$ | | |
| $r_3 = 7.658$ | $d_3 = 1.57$ | $n_{d2} = 1.83297$ | $V_{d2} = 23.93$ |
| $r_4 = 16.048$ | $d_4 = $ variable | | |
| $r_5 = \infty$ (S) | $d_5 = 0.00$ | | |
| $r_6 = 3.663(AS)$ | $d_6 = 2.05$ | $n_{d3} = 1.68754$ | $V_{d3} = 49.90$ |
| $r_7 = -31.727$ | $d_7 = 0.50$ | $n_{d4} = 1.77797$ | $V_{d4} = 28.17$ |
| $r_8 = 3.415$ | $d_8 = 0.41$ | | |
| $r_9 = 6.275$ | $d_9 = 1.49$ | $n_{d5} = 1.73261$ | $V_{d5} = 43.71$ |
| $r_{10} = -13.793$ | $d_{10} = $ variable | | |
| $r_{11} = -8.238(AS)$ | $d_{11} = 1.00$ | $n_{d6} = 1.66701$ | $V_{d6} = 51.50$ |
| $r_{12} = -51.089$ | $d_{12} = $ variable | | |
| $r_{13} = \infty$ | $d_{13} = 0.84$ | $n_{d7} = 1.53996$ | $V_{d7} = 59.45$ |
| $r_{14} = \infty$ | $d_{14} = 0.26$ | | |
| $r_{15} = \infty$ | $d_{15} = 0.49$ | $n_{d8} = 1.51633$ | $V_{d8} = 64.14$ |
| $r_{16} = \infty$ | $d_{16} = 0.59$ | | |
| $r_{17} = \infty$ (I) | | | |

TABLE 7

Aspherical Surface Coefficient

| | 2nd surface | 6th surface | 11th surface |
|---|---|---|---|
| K | 0.000 | $-0.273$ | 0.000 |
| $A_4$ | $-3.08658 \times 10^{-4}$ | $-4.17703 \times 10^{-4}$ | $-1.01531 \times 10^{-3}$ |
| $A_6$ | $-1.76184 \times 10^{-5}$ | $1.73031 \times 10^{-5}$ | $-1.81385 \times 10^{-4}$ |
| $A_8$ | $4.93150 \times 10^{-7}$ | $-4.52094 \times 10^{-6}$ | $1.37151 \times 10^{-5}$ |
| $A_{10}$ | $-4.70815 \times 10^{-8}$ | $2.69291 \times 10^{-7}$ | $1.33887 \times 10^{-7}$ |
| $A_{12}$ | 0 | 0 | 0 |

TABLE 8

Zoom Data (∞)

|  | WE | ST | TE |
|---|---|---|---|
| f (mm) | 6.27 | 10.70 | 18.26 |
| $F_{NO}$ | 3.39 | 4.34 | 5.90 |
| 2ω(°) | 65.17 | 39.14 | 23.34 |
| $d_4$ | 12.37 | 5.07 | 0.63 |
| $d_{10}$ | 2.75 | 2.64 | 2.71 |
| $d_{12}$ | 3.59 | 6.53 | 11.08 |

Numerical Example 5

| | | | |
|---|---|---|---|
| $r_1 = -44.698$ | $d_1 = 1.00$ | $n_{d1} = 1.88300$ | $V_{d1} = 40.76$ |
| $r_2 = 6.861(AS)$ | $d_2 = 2.18$ | | |
| $r_3 = 15.150$ | $d_3 = 1.28$ | $n_{d2} = 1.92286$ | $V_{d2} = 20.88$ |
| $r_4 = 95.927$ | $d_4 = $ variable | | |
| $r_5 = \infty$ (S) | $d_5 = 0.00$ | | |
| $r_6 = 5.624(AS)$ | $d_6 = 1.66$ | $n_{d3} = 1.49700$ | $V_{d3} = 81.54$ |
| $r_7 = 72.841$ | $d_7 = 0.11$ | | |
| $r_8 = 8.947$ | $d_8 = 0.50$ | $n_{d4} = 2.00069$ | $V_{d4} = 25.46$ |
| $r_9 = 5.000$ | $d_9 = 1.92$ | $n_{d5} = 1.52249$ | $V_{d5} = 59.84$ |
| $r_{10} = -20.892$ | $d_{10} = $ variable | | |
| $r_{11} = -10.378(AS)$ | $d_{11} = 1.00$ | $n_{d6} = 1.69350$ | $V_{d6} = 53.21$ |
| $r_{12} = 66.415(AS)$ | $d_{12} = $ variable | | |
| $r_{13} = \infty$ | $d_{13} = 0.86$ | $n_{d7} = 1.53996$ | $V_{d7} = 59.45$ |
| $r_{14} = \infty$ | $d_{14} = 0.27$ | | |
| $r_{15} = \infty$ | $d_{15} = 0.50$ | $n_{d8} = 1.51633$ | $V_{d8} = 64.14$ |
| $r_{16} = \infty$ | $d_{16} = 0.59$ | | |
| $r_{17} = \infty$ (I) | | | |

TABLE 9

Aspherical Surface Coefficient

| | 2nd surface | 6th surface | 11th surface | 12th surface |
|---|---|---|---|---|
| K | 0.000 | 0.000 | −79.924 | 0.000 |
| $A_4$ | $-3.86031 \times 10^{-4}$ | $-7.33669 \times 10^{-4}$ | $-1.95090 \times 10^{-2}$ | $-9.08431 \times 10^{-3}$ |
| $A_6$ | $1.39087 \times 10^{-5}$ | $-3.01238 \times 10^{-6}$ | $2.53199 \times 10^{-3}$ | $7.73390 \times 10^{-4}$ |
| $A_8$ | $-1.86842 \times 10^{-6}$ | $-6.27478 \times 10^{-7}$ | $-4.44080 \times 10^{-4}$ | $-8.69894 \times 10^{-5}$ |
| $A_{10}$ | $5.37994 \times 10^{-8}$ | 0 | $3.04386 \times 10^{-5}$ | $4.76551 \times 10^{-6}$ |
| $A_{12}$ | 0 | 0 | 0 | 0 |

TABLE 10

Zoom Data (∞)

|  | WE | ST | TE |
|---|---|---|---|
| f (mm) | 6.82 | 11.62 | 19.70 |
| $F_{NO}$ | 3.25 | 4.30 | 6.09 |
| 2ω(°) | 60.87 | 36.47 | 21.84 |
| $d_4$ | 9.86 | 3.85 | 0.39 |
| $d_{10}$ | 7.11 | 7.43 | 7.75 |
| $d_{12}$ | 1.00 | 3.59 | 8.06 |

Numerical Example 6

| | | | |
|---|---|---|---|
| $r_1 = -68.489$ | $d_1 = 1.00$ | $n_{d1} = 1.80610$ | $V_{d1} = 40.92$ |
| $r_2 = 4.409(AS)$ | $d_2 = 1.19$ | | |
| $r_3 = 8.039$ | $d_3 = 1.67$ | $n_{d2} = 2.00069$ | $V_{d2} = 25.46$ |
| $r_4 = 23.572$ | $d_4 = $ variable | | |

-continued

Numerical Example 6

| | | | |
|---|---|---|---|
| $r_5 = \infty$ (S) | $d_5 = -0.50$ | | |
| $r_6 = 3.689(AS)$ | $d_6 = 3.79$ | $n_{d3} = 1.49700$ | $V_{d3} = 81.54$ |
| $r_7 = -10.025$ | $d_7 = 1.00$ | $n_{d4} = 1.84666$ | $V_{d4} = 23.78$ |
| $r_8 = -28.095(AS)$ | $d_8 = $ variable | | |
| $r_9 = -4.148$ | $d_9 = 0.80$ | $n_{d5} = 1.88300$ | $V_{d5} = 40.76$ |
| $r_{10} = -5.287$ | $d_{10} = $ variable | | |
| $r_{11} = \infty$ | $d_{11} = 0.50$ | $n_{d6} = 1.51633$ | $V_{d6} = 64.14$ |
| $r_{12} = \infty$ | $d_{12} = 0.50$ | | |
| $r_{13} = \infty$ | $d_{13} = 0.50$ | $n_{d7} = 1.51633$ | $V_{d7} = 64.14$ |
| $r_{14} = \infty$ | $d_{14} = 0.59$ | | |
| $r_{15} = \infty$ (I) | | | |

TABLE 11

Aspherical Surface Coefficient

| | 2nd surface | 6th surface | 8th surface |
|---|---|---|---|
| K | −0.549 | −0.795 | 0.000 |
| $A_4$ | $-1.09327 \times 10^{-4}$ | $1.48463 \times 10^{-3}$ | $2.40186 \times 10^{-3}$ |
| $A_6$ | $-1.43880 \times 10^{-5}$ | $3.05264 \times 10^{-5}$ | $2.76882 \times 10^{-4}$ |
| $A_8$ | $1.34815 \times 10^{-7}$ | $1.15726 \times 10^{-5}$ | $-3.25134 \times 10^{-5}$ |
| $A_{10}$ | $-5.73863 \times 10^{-9}$ | $-1.32653 \times 10^{-7}$ | $9.56196 \times 10^{-6}$ |
| $A_{12}$ | 0 | 0 | 0 |

TABLE 12

Zoom Data (∞)

|  | WE | ST | TE |
|---|---|---|---|
| f (mm) | 6.28 | 10.70 | 18.20 |
| $F_{NO}$ | 3.25 | 4.16 | 5.74 |
| 2ω(°) | 68.16 | 39.90 | 23.65 |
| $d_4$ | 11.19 | 4.99 | 1.50 |
| $d_8$ | 3.56 | 4.37 | 4.93 |
| $d_{10}$ | 4.21 | 6.63 | 11.70 |

Numerical Example 7

| | | | |
|---|---|---|---|
| $r_1 = -123.809$ | $d_1 = 0.70$ | $n_{d1} = 1.88300$ | $V_{d1} = 40.76$ |
| $r_2 = 6.941$ | $d_2 = 0.99$ | | |
| $r_3 = 9.801(AS)$ | $d_3 = 1.63$ | $n_{d2} = 1.84666$ | $V_{d2} = 23.78$ |
| $r_4 = 29.771(AS)$ | $d_4 = $ variable | | |
| $r_5 = \infty$ (S) | $d_5 = -0.52$ | | |
| $r_6 = 3.591(AS)$ | $d_6 = 1.97$ | $n_{d3} = 1.49700$ | $V_{d3} = 81.54$ |
| $r_7 = -23.495$ | $d_7 = 0.50$ | $n_{d4} = 1.92286$ | $V_{d4} = 18.90$ |
| $r_8 = -93.239$ | $d_8 = 1.79$ | $n_{d5} = 1.51633$ | $V_{d5} = 64.14$ |
| $r_9 = -160.642(AS)$ | $d_9 = $ variable | | |
| $r_{10} = -16.790(AS)$ | $d_{10} = 0.80$ | $n_{d6} = 1.50913$ | $V_{d6} = 56.20$ |
| $r_{11} = 22.686(AS)$ | $d_{11} = $ variable | | |
| $r_{12} = \infty$ | $d_{12} = 0.50$ | $n_{d7} = 1.51633$ | $V_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.40$ | | |
| $r_{16} = \infty$ (I) | | | |

TABLE 13-1

Aspherical Surface Coefficient

| | 3rd surface | 4th surface | 6th surface | 9th surface |
|---|---|---|---|---|
| K | 0.000 | 0.000 | 0.000 | 0.000 |
| $A_4$ | $-2.75036 \times 10^{-4}$ | $-3.71542 \times 10^{-4}$ | $-4.17928 \times 10^{-4}$ | $4.85479 \times 10^{-3}$ |

TABLE 13-1-continued

Aspherical Surface Coefficient

| | 3rd surface | 4th surface | 6th surface | 9th surface |
|---|---|---|---|---|
| $A_6$ | $-3.07840 \times 10^{-5}$ | $-3.43210 \times 10^{-5}$ | $2.46517 \times 10^{-5}$ | $4.60043 \times 10^{-4}$ |
| $A_8$ | $1.58082 \times 10^{-6}$ | $2.04735 \times 10^{-6}$ | $2.80412 \times 10^{-6}$ | $-8.22251 \times 10^{-6}$ |
| $A_{10}$ | $-3.29070 \times 10^{-8}$ | $-5.01217 \times 10^{-8}$ | $-3.23125 \times 10^{-7}$ | $1.98515 \times 10^{-5}$ |
| $A_{12}$ | 0 | 0 | 0 | 0 |

TABLE 13-2

| | 10th surface | 11th surface |
|---|---|---|
| K | 0.000 | 0.000 |
| $A_4$ | $-2.47640 \times 10^{-3}$ | $-1.93357 \times 10^{-3}$ |
| $A_6$ | $-2.34974 \times 10^{-4}$ | $-1.52885 \times 10^{-4}$ |
| $A_8$ | $1.88850 \times 10^{-4}$ | $1.29934 \times 10^{-4}$ |
| $A_{10}$ | $-1.61128 \times 10^{-5}$ | $-1.10625 \times 10^{-5}$ |
| $A_{12}$ | 0 | 0 |

TABLE 14

Zoom Data (∞)

| | WE | ST | TE |
|---|---|---|---|
| f (mm) | 6.81 | 11.60 | 19.75 |
| $F_{NO}$ | 3.33 | 4.32 | 5.80 |
| 2ω(°) | 65.28 | 36.90 | 21.63 |
| $d_4$ | 12.84 | 5.76 | 0.92 |
| $d_9$ | 3.15 | 2.84 | 3.65 |
| $d_{11}$ | 3.85 | 7.17 | 10.57 |

Numerical Example 8

| | | | |
|---|---|---|---|
| $r_1 = -34.705$ | $d_1 = 0.95$ | $n_{d1} = 1.80610$ | $V_{d1} = 40.92$ |
| $r_2 = 7.051(AS)$ | $d_2 = 1.54$ | | |
| $r_3 = 12.304$ | $d_3 = 2.07$ | $n_{d2} = 200069$ | $V_{d2} = 25.46$ |
| $r_4 = 52.168$ | $d_4$ = variable | | |
| $r_5 = \infty$ (S) | $d_5 = -1.18$ | | |
| $r_6 = 4.577(AS)$ | $d_6 = 2.64$ | $n_{d3} = 1.49700$ | $V_{d3} = 81.54$ |
| $r_7 = 87.702$ | $d_7 = 0.60$ | $n_{d4} = 1.80810$ | $V_{d4} = 22.76$ |
| $r_8 = 14.053$ | $d_8 = 2.21$ | $n_{d5} = 1.49700$ | $V_{d5} = 81.54$ |
| $r_9 = -65.670(AS)$ | $d_9$ = variable | | |
| $r_{10} = -22.159(AS)$ | $d_{10} = 0.80$ | $n_{d6} = 1.52542$ | $V_{d6} = 55.78$ |
| $r_{11} = 130.774(AS)$ | $d_{11}$ = variable | | |
| $r_{11} = \infty$ | $d_{12} = 0.50$ | $n_{d7} = 1.53996$ | $V_{d7} = 59.45$ |
| $r_{13} = \infty$ | $d_{13} = 0.50$ | | |
| $r_{14} = \infty$ | $d_{14} = 0.50$ | $n_{d8} = 1.51633$ | $V_{d8} = 64.14$ |
| $r_{15} = \infty$ | $d_{15} = 0.42$ | | |
| $r_{16} = \infty$ (I) | | | |

TABLE 15-1

Aspherical Surface Coefficient

| | 2nd surface | 6th surface | 9th surface | 10th surface |
|---|---|---|---|---|
| K | 0.000 | 0.000 | 0.000 | 0.000 |
| $A_4$ | $-2.39358 \times 10^{-4}$ | $-2.30366 \times 10^{-4}$ | $2.56285 \times 10^{-3}$ | $1.96811 \times 10^{-4}$ |
| $A_6$ | $-5.68999 \times 10^{-6}$ | $8.36646 \times 10^{-7}$ | $2.19102 \times 10^{-5}$ | $-1.09241 \times 10^{-4}$ |
| $A_8$ | $1.10603 \times 10^{-7}$ | $9.08393 \times 10^{-8}$ | $4.74149 \times 10^{-5}$ | $9.88849 \times 10^{-6}$ |
| $A_{10}$ | $-4.44730 \times 10^{-9}$ | 0 | $-7.24474 \times 10^{-6}$ | $-2.12643 \times 10^{-7}$ |
| $A_{12}$ | 0 | 0 | $6.43200 \times 10^{-7}$ | 0 |

TABLE 15-2

| | 11th surface |
|---|---|
| K | 0.000 |
| $A_4$ | $1.82798 \times 10^{-4}$ |
| $A_6$ | $-4.12618 \times 10^{-5}$ |
| $A_8$ | $-2.94854 \times 10^{-7}$ |
| $A_{10}$ | 0 |
| $A_{12}$ | 0 |

TABLE 16

Zoom Data (∞)

| | WE | ST | TE |
|---|---|---|---|
| f (mm) | 8.16 | 13.67 | 23.51 |
| $F_{NO}$ | 2.88 | 3.70 | 5.03 |
| 2ω(°) | 65.04 | 37.58 | 21.87 |
| $d_4$ | 15.90 | 7.41 | 1.58 |
| $d_9$ | 3.13 | 2.89 | 4.38 |
| $d_{11}$ | 7.19 | 11.42 | 15.92 |

FIGS. 9A to 16C show aberration diagrams of Examples 1 to 8 when focused on the infinite objects. In these diagrams, FIGS. 9A, 10A, 11A . . . show spherical aberrations (SA), astigmatisms (AS), distortions (DT) and chromatic aberrations of magnifications (CC) in wide-angle ends, FIGS. 9B, 10B, 11B, . . . show them in intermediate states, and FIGS. 9C, 10C, 11C . . . show them in telephoto ends. In the drawings, "FIY" is the maximum image height.

Next, there will be described basic parameter values of the conditions (1) to (B), values of the conditions (1) to (B) and a constitution of the second lens unit in the above examples. It is to be noted that in a line of the constitution of the second lens unit, P is a positive single lens, PN is a cemented lens including a positive lens and a negative lens, NP is a cemented lens including a negative lens and a positive lens, PNN is a cemented triplet including a positive lens, a negative lens and a negative lens and PNP is a cemented triplet including a positive lens, a negative lens and a positive lens. Moreover, for example, P-NP indicates that the second lens unit is constituted of a positive single lens and a cemented lens including a negative lens and a positive lens.

TABLE 17-1

| Basic parameter values of the conditions | Numerical Example 1 | Numerical Example 2 | Numerical Example 3 | Numerical Example 4 |
|---|---|---|---|---|
| $C_j$ (w) | 32.76 | 30.17 | 30.52 | 30.50 |
| $C_j$ (t) | 26.14 | 30.26 | 30.28 | 26.20 |
| $β_2$ (w) | −0.31 | −0.38 | −0.47 | −0.33 |
| $β_2$ (t) | −0.71 | −0.68 | −1.04 | −0.71 |
| $β_3$ (w) | 1.59 | 1.29 | 1.30 | 1.41 |

TABLE 17-1-continued

| Basic parameter values of the conditions | Numerical Example 1 | Numerical Example 2 | Numerical Example 3 | Numerical Example 4 |
|---|---|---|---|---|
| $\beta_3$ (t) | 2.04 | 2.07 | 1.73 | 1.91 |
| $f_1$ | −13.68 | −13.23 | −10.35 | −13.50 |
| $f_2$ | 7.49 | 8.09 | 8.17 | 7.27 |
| $f_3$ | −12.49 | −14.85 | −18.99 | −14.86 |
| $D_1$ (w) | 13.81 | 10.78 | 9.90 | 12.37 |
| $D_2$ (w) | 1.97 | 4.55 | 3.30 | 2.75 |
| $D_2$ (t) | 3.21 | 2.70 | 4.28 | 2.71 |
| $D_{3G}$ | 0.80 | 1.00 | 1.00 | 1.00 |
| $f_w$ | 6.80 | 6.45 | 6.35 | 6.27 |
| $f_t$ | 19.67 | 18.59 | 18.59 | 18.26 |
| (1) | 0.80 | 1.00 | 0.99 | 0.86 |
| (2) | 2.26 | 1.80 | 2.20 | 2.14 |
| (3) | 1.77 | 1.13 | 1.65 | 1.58 |
| (4) | 1.83 | 1.64 | 1.27 | 1.86 |
| (5) | 2.03 | 1.67 | 1.56 | 1.97 |
| (6) | 1.63 | 0.59 | 1.30 | 0.98 |
| (7) | 0.18 | −0.29 | 0.15 | −0.01 |
| (8) | 1.33 | 1.63 | 1.63 | 1.43 |
| (9) | 1.84 | 2.30 | 2.99 | 2.37 |
| (10) | 0.041 | 0.054 | 0.054 | 0.055 |
| (A) | 2.89 | 2.88 | 2.93 | 2.91 |
| (B) | −3.15 | −3.29 | −2.00 | −2.65 |
| Constitution of the second lens unit | PNP | P-NP | P-PN | PN-P |

TABLE 17-2

| Basic parameter values of the conditions | Numerical Example 5 | Numerical Example 6 | Numerical Example 7 | Numerical Example 8 |
|---|---|---|---|---|
| $C_j$ (w) | 29.84 | 30.00 | 29.60 | 37.76 |
| $C_j$ (t) | 28.06 | 29.17 | 24.90 | 33.43 |
| $\beta_2$ (w) | −0.44 | −0.47 | −0.36 | −0.41 |
| $\beta_2$ (t) | −0.89 | −1.16 | −0.83 | −1.00 |
| $\beta_3$ (w) | 1.25 | 1.27 | 1.30 | 1.26 |
| $\beta_3$ (t) | 1.80 | 1.50 | 1.66 | 1.50 |
| $f_1$ | −12.24 | −10.46 | −14.34 | −15.73 |
| $f_2$ | 8.40 | 7.71 | 7.75 | 10.08 |
| $f_3$ | −12.87 | −32.52 | −18.82 | −36.00 |
| $D_1$ (w) | 9.86 | 10.69 | 12.32 | 14.72 |
| $D_2$ (w) | 7.11 | 3.56 | 3.15 | 3.13 |
| $D_2$ (t) | 7.75 | 4.93 | 3.65 | 4.38 |
| $D_{3G}$ | 1.00 | 0.80 | 0.80 | 0.80 |
| $f_w$ | 6.82 | 6.28 | 6.81 | 8.16 |
| $f_t$ | 19.70 | 18.20 | 19.75 | 23.51 |
| (1) | 0.94 | 0.97 | 0.84 | 0.89 |
| (2) | 2.01 | 2.46 | 2.28 | 2.42 |
| (3) | 1.40 | 2.08 | 1.79 | 2.02 |
| (4) | 1.46 | 1.36 | 1.85 | 1.56 |
| (5) | 1.45 | 1.70 | 1.81 | 1.80 |
| (6) | 1.09 | 1.39 | 1.16 | 1.40 |
| (7) | 0.09 | 0.22 | 0.07 | 0.15 |
| (8) | 1.42 | 1.60 | 1.26 | 1.42 |
| (9) | 1.89 | 5.18 | 2.76 | 4.41 |
| (10) | 0.051 | 0.044 | 0.041 | 0.034 |
| (A) | 2.89 | 2.90 | 2.90 | 2.88 |
| (B) | −2.24 | −1.26 | −1.76 | −1.25 |
| Constitution of the second lens unit | P-NP | PN | PNN | PNP |

When the above zoom lens systems, especially zoom lens systems described in Examples 6, 7, 8 are used as photographing lenses of image pickup apparatuses including electronic image sensors, a distortion remaining in an optical image of an object formed by each zoom lens system can electrically be corrected (digital correction) by digital signal processing. Here, there will be described a basic concept in digitally correcting the distortion of the optical image.

Figure 17:
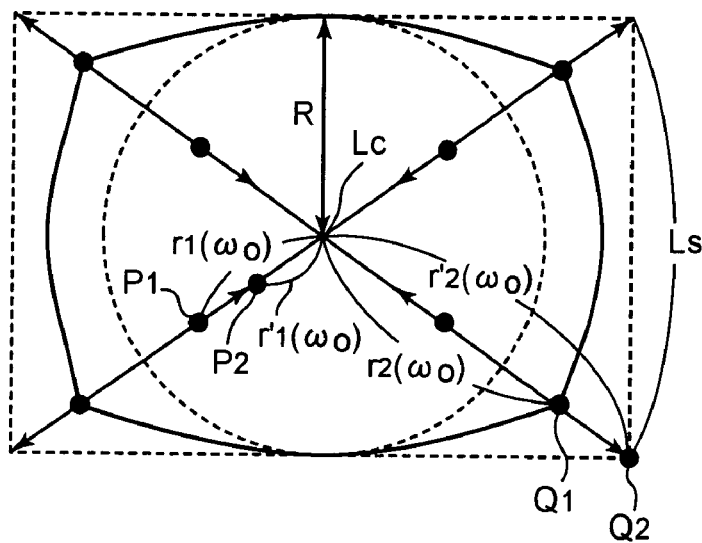
FIG. 17 is an explanatory view of a basic concept for digitally correcting a distortion of an optical image.
Figure 18:
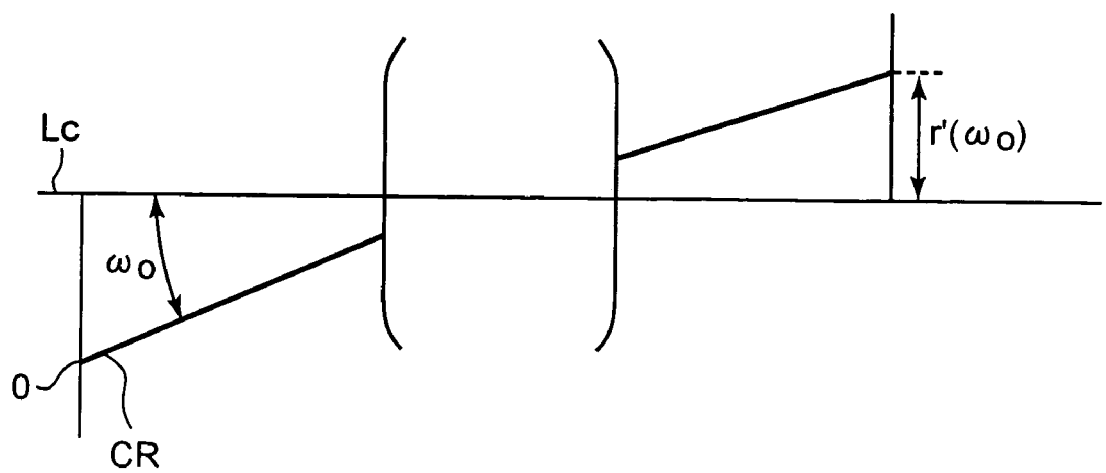
FIG. 18 is a diagram showing a relation between an image height and a half angle of view of an object.

As shown in FIG. 17, assuming that a circle having a radius R (image height R) is on the image pickup surface whose center is at the intersection of the optical axis Lc and the image pickup surface and which is tangent to the long sides of the effective image pickup region (a region on the image pickup surface where the image pickup is possible). The magnification at each point on the circumference of the circle is fixed and the each point is regarded as a reference of correction. Moreover, points on a circumference of another circle having an arbitrary radius $r(\omega_o)$ (an image height $r(\omega_o)$) are moved in a substantially radial direction, and moved concentrically so as to obtain a radius $r'(\omega_o)$, thereby correcting the distortion of the optical image. For example, in FIG. 17, a point P1 on the circumference of an arbitrary circle having a radius $r'(\omega_o)$, positioned inside the circle having the radius R, is directed toward the center of the circle, and moved to a point P2 on the circumference of a circle having a radius $r_1'(\omega_o)$. A point Q1 on the circumference of a circle having an arbitrary radius $r_2(\omega_o)$, positioned outside the circle having the radius R, is directed in the direction distant from the center of the circle, and moved to a point Q2 on the circumference of a circle having a radius $r_2'(\omega_o)$. Here, $r'(\omega_o)$ can be represented as follows:

$$r'(\omega_o) = \alpha \cdot f \cdot \tan \omega_o \, (0 \leq \alpha \leq 1),$$

wherein f is a focal length of an image forming optical system (a zoom lens system) and $\omega_o$ is a half angle of view of the object. Here, as shown in FIG. 18, the half angle of view of the object is an angle of a chief ray CR from an object point O with respect to the optical axis Lc, the object point corresponding to an image point formed in a position of a height r from the center of the image pickup surface.

Here, assuming that an ideal image height corresponding to the point on the circumference of the circle having the radius R (the image height R) is Y, the following results:

$$\alpha = R/Y = R/(f \cdot \tan \omega).$$

The optical system is ideally rotationally symmetric with respect to the optical axis. Therefore, the distortion is also generated rotationally symmetrically with respect to the optical axis. Therefore, in order to electrically correct the optically generated distortion, the magnification is fixed on the circumference of the circle having the radius R which is tangent to the long sides of the effective image pickup region and whose center is at a point corresponding to the intersection of the optical axis Lc and the image pickup surface in the image to be reproduced, and the points on the circumference of the other circle having the radius $r(\omega_o)$ are concentrically moved to the position of the radius $r'(\omega_o)$ in the radial direction, as described above. If the distortion can thus be corrected, the method of correcting distortion is considered to be advantageous in view of the data amount and the calculation amount.

However, when the optical image is picked up by the electronic image sensor, the image is no longer indicated with a continuous amount due to the sampling by the pixels of the image sensor. Therefore, the circle having the radius R virtually drawn on the optical image is not strictly a correct circle as long as pixels are not radially arranged on the image pickup surface of the electronic image sensor. That is, in the shape correction of an image given as a set of data obtained from discrete coordinate points (pixels of the electronic image sensor), any circle on which the magnification can be fixed as described above does not exist.

Therefore, it is preferable to use a method of determining the coordinate (Xi', Yj') of the position for each pixel (which is at a point of coordinate (Xi, Yj) to which the pixel is to be moved for shape correction. It is to be noted that when a plurality of pixels move to one coordinate (Xi', Yj') position, an average value of data of the plurality of pixels is taken. With respect to a position where there is not any moved pixel, interpolation is performed using data values of several peripheral pixels having data because the pixels have been moved. In consequence, the data of the position is prepared.

Such a method is effective even for the correction in a case where the points on the optical image whose magnifications have to be fixed are not arranged on the circumference centering on the optical axis, and the points become asymmetric with respect to the optical axis owing to manufacturing errors of the optical system or the electronic image sensor in the electronic image pickup apparatus including the zoom lens system.

In the electronic image pickup apparatus which performs such correction, in order to calculate a correction amount $r'(\omega_o)-r(\omega_o)$, data indicating a relation between the half angle $(\omega_o)$ of view of the object and the image height r or data indicating a relation between an actual image height r, an ideal image heights r' and a coefficient α may be recorded in a recording medium incorporated in the electronic image pickup apparatus.

It is to be noted that in the image having the distortion corrected, the radius R preferably satisfies the following condition so that a quantity of light is not excessively insufficient in opposite ends of the image in a short-side direction.

$0 \leq R \leq 0.6\ L_S$, wherein $L_S$ is a length of a short side of the effective image pickup surface.

It is more preferable that the radius R satisfies the following condition:

$0.3\ L_S \leq R \leq 0.6\ L_S$.

Furthermore, it is most advantageous that the radius R substantially agrees with the radius of the circle which comes into contact with the short sides of the effective image pickup surface.

It is to be noted that when the correction is performed in the state that the magnification is fixed in the vicinity of the radius R=0, that is, in the vicinity of the optical axis to perform the correction, a region to be extended in a radial direction increases. This is slightly disadvantageous in the viewpoint of the number of the pixels, but it is possible to secure the effect that even the zoom lens system having a wide angle can be minimized.

It is to be noted that the correction of the distortion of one image has been described above. However, in the zoom lens system, when the focal length changes, the state of the distortion included in the image changes. Therefore, the focal length range between a maximum value (telephoto end) and a minimum value (wide-angle end) of the focal length, where the distortion needs to be corrected, is divided into several focal length zones to correct the distortion. For example, a correction amount is set so as to obtain a correction result which substantially satisfies $r'(\omega_o)=\alpha \cdot f \cdot \tan \omega_o$ in the vicinity of the telephoto end (position where the focal length is maximum in each zone) of each divided focal length zone, and the distortion of the image in the zone can be corrected using this correction amount. However, in this case, in the wide-angle end (position where the focal length is minimum in each zone) in each divided focal length zone, a certain degree of barrel type distortion remains in the obtained image. To avoid this, when the number of the divided zones is increased, the amount of the data to be recorded in the recording medium for the correction is increased. To solve the problem, one or several coefficients are calculated beforehand which correspond to one or several focal lengths excluding the telephoto end and the wide-angle end of each divided focal length zone. This coefficient may be determined based on simulation or measurement using an actual image pickup apparatus. Moreover, the correction amount is calculated so as to obtain the correction result which substantially satisfies $r'(\omega_o)=\alpha \cdot f \cdot \tan \omega_o$ in the vicinity of the telephoto end of each divided zone, and this correction amount may be multiplied by the coefficient for each focal length to determine the correction amount of the image obtained in that focal length state.

If there is no distortion in the resultant image of the infinite object, the following relation is established:

$f=y/\tan \omega_o$, wherein y is a height (an image height) from the optical axis of the image point, f is a focal length of the image forming optical system (here, the zoom lens system), and $\omega_o$ is a half angle of view of the object.

If there is a barrel type distortion in the image forming optical system, the following results:

$f>y/\tan \omega_o$.

That is, when the focal length f of the image forming optical system and the image height y are constant, the value of $\omega_o$ increases.

Next, there will be described an example of the image pickup apparatus to which the zoom lens system of the present invention has been applied.

Figure 19:
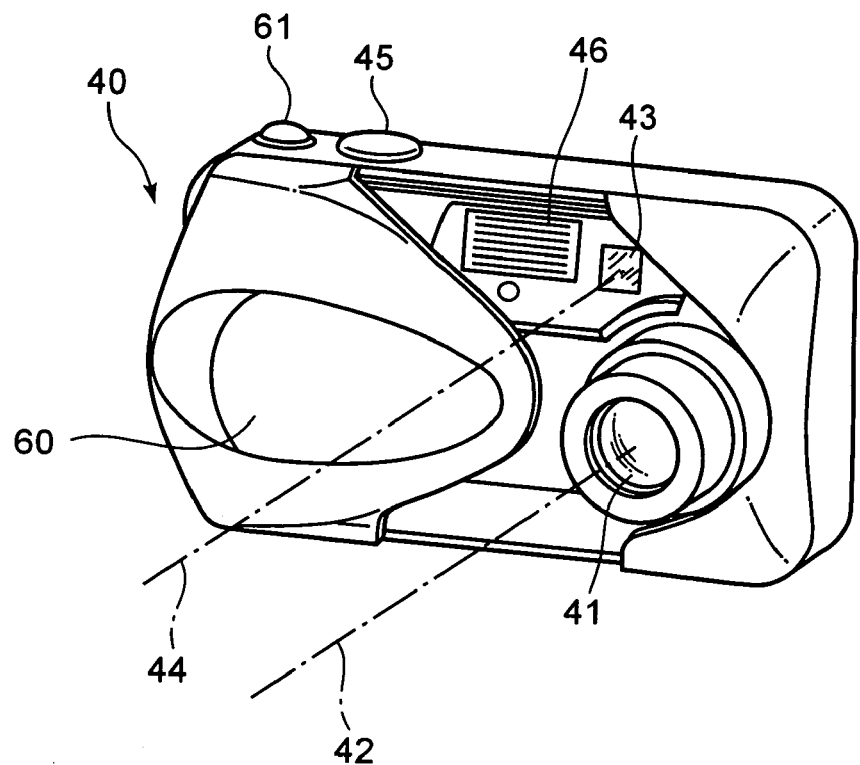
FIG. 19 is a front perspective view showing an appearance of a digital camera.
Figure 20:
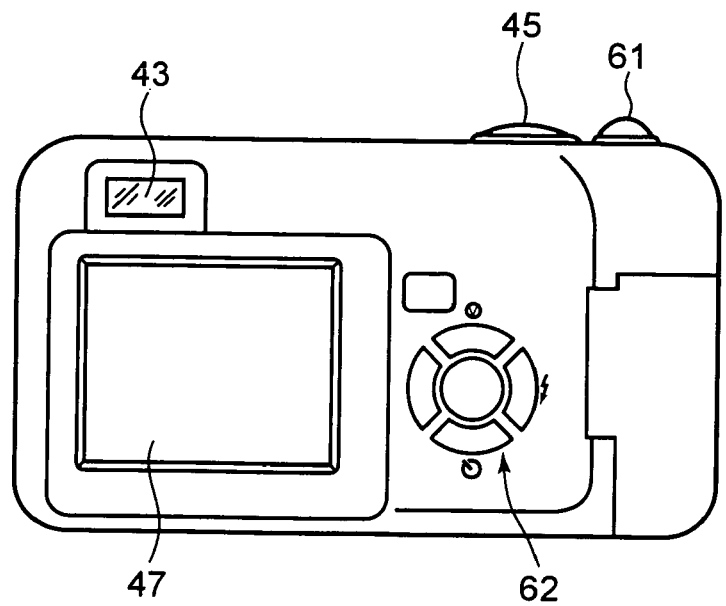
FIG. 20 is a rear view of the digital camera shown in FIG. 19.
Figure 21:
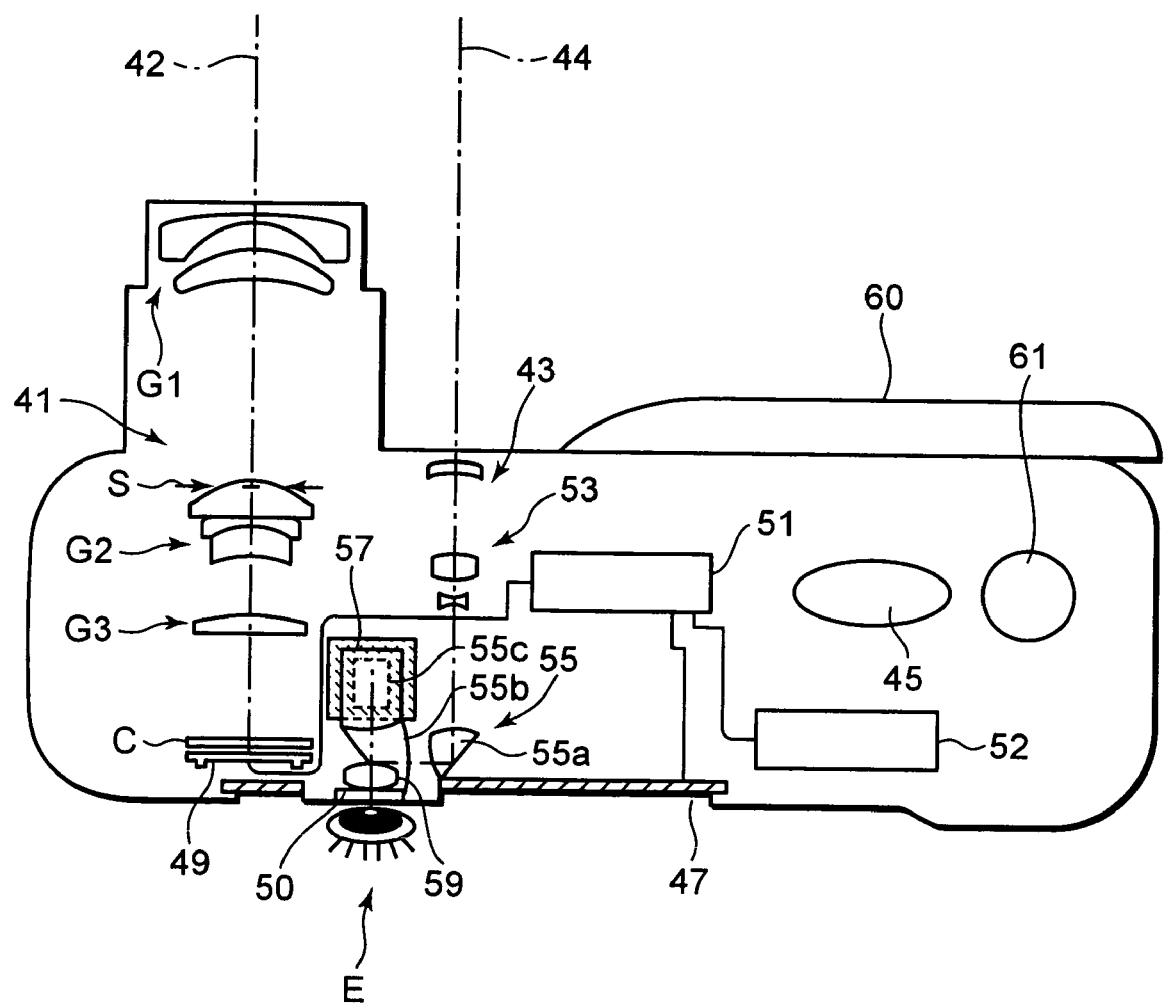
FIG. 21 is a schematic sectional view showing an inner constitution of the digital camera shown in FIG. 19.

FIGS. 19 to 21 are conceptual diagrams showing a constitution of a digital camera in which the above-described zoom optical system is incorporated in a photographing optical system 41. FIG. 19 is a front perspective view showing an appearance of a digital camera 40, FIG. 20 is a rear view of the digital camera, and FIG. 21 is a schematic sectional view showing an inner constitution of the digital camera 40. FIGS. 19 and 21 show a state in which a lens barrel is not collapsed in the photographing optical system 41.

The digital camera 40 includes the photographing optical system 41 positioned along a photographing optical path 42; a finder optical system 43 positioned along an optical path 44 for a finder; a shutter button 45; a flash lamp 46; a liquid crystal display monitor 47; a focal length change button 61; a camera setting change switch 62 and the like. In a case where the lens barrel of the photographing optical system 41 is collapsed, when a cover 60 is slid, the photographing optical system 41, the finder optical system 43 and the flash lamp 46 are covered with the cover 60. Moreover, when the cover 60 is opened to set the camera 40 to a photographing state, the photographing optical system 41 is brought into the non-collapsed state as shown in FIG. 21. When the shutter button 45 disposed in an upper portion of the camera 40 is pressed, the photographing is performed through the photographing optical system 41 in response to the pressed button. An object image formed by the photographing optical system 41 is formed on an image pickup surface (photoelectric conversion surface) of a CCD image sensor 49 via a cover glass C having the surface provided with a wavelength region restrictive coating. The object image received by the CCD image sensor 49 is displayed as an electronic image in the liquid crystal display monitor 47 disposed in a rear surface of the camera via processing means 51. This processing means 51 is connected to recording means 52, and the photographed electronic image can be recorded. It is to be noted that this recording means 52 may be disposed separately from or integrally with the processing means 51. As the recording means, there may be used a memory or an HDD (Hard Disc Drive) incorporated in the digital camera, or an HDD, a memory card or a DVD detachably attached to the digital camera.

Furthermore, an objective optical system 53 for the finder is disposed along the optical path 44 for the finder. The objective optical system 53 for the finder is a zoom lens system constituted of a plurality of lens units (three units in the drawing) and an image erecting prism system 55 including prisms 55a, 55b and 55c. The system is constituted so that the focal length changes in conjunction with the zoom lens system of the photographing optical system 41. The object image formed by this objective optical system 53 for the finder is formed on the view field frame 57 in the image erecting prism system 55. On the exit side of this image erecting prism system 55, an eyepiece optical system 59 is disposed which guides an erected image into the observer's eyeball E. A cover member 50 is disposed on the exit side of the eyepiece optical system 59.

As the photographing optical system 41, the zoom optical system according to the present invention is used. In FIG. 21, the zoom optical system of Example 1 shown in FIG. 1A is used, but needless to say, another example is applicable.

Figure 22:
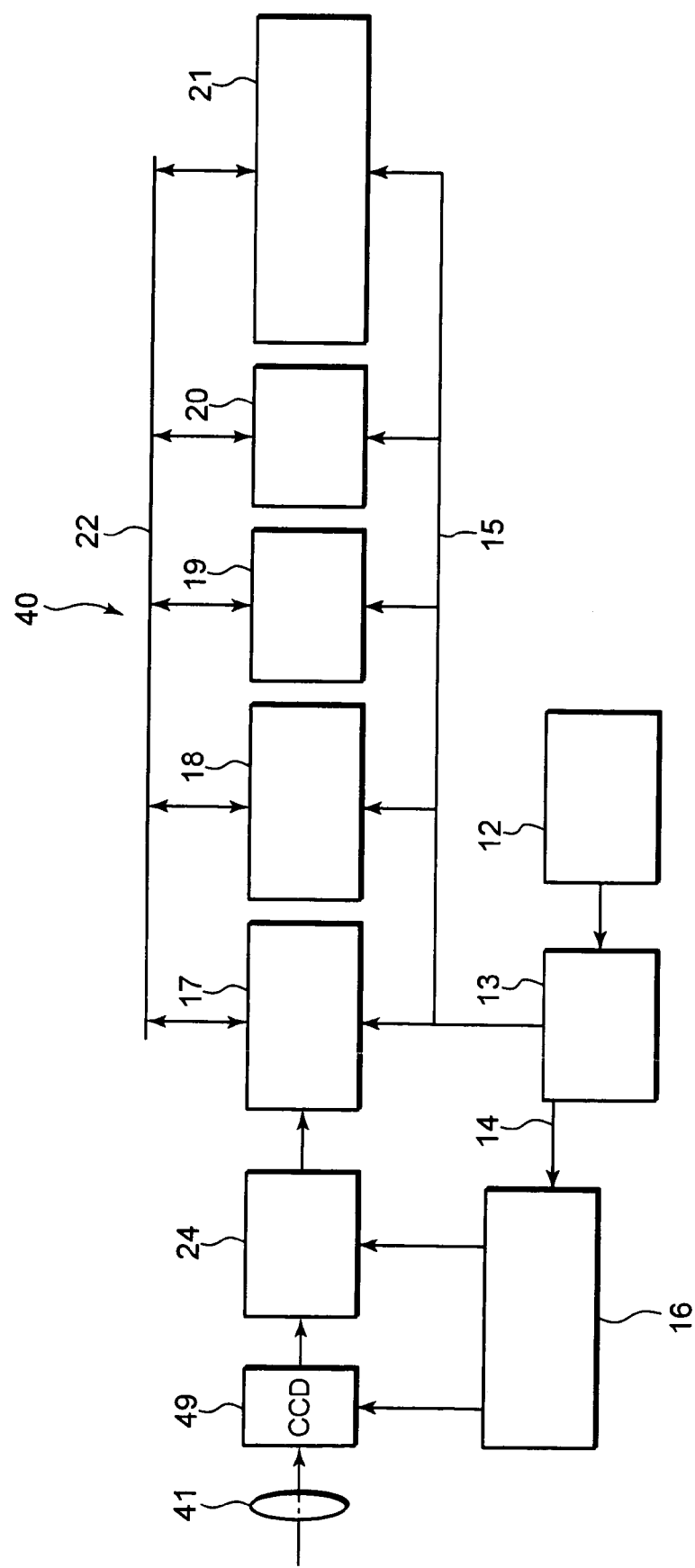
FIG. 22 is a block diagram of a main part of an inner circuit of the digital camera shown in FIG. 19.

FIG. 22 is a block diagram of an inner circuit of the digital camera 40. It is to be noted that in the following description, the above processing means 51 includes, for example, a correlated double sampling (CDS)/analog digital conversion (ADC) section 24, a temporary storage memory 17, an image processing section 18 and the like, and the recording means 52 includes, for example, a storage medium section 19 and the like.

As shown in FIG. 22, the digital camera 40 includes an operating section 12; a control section 13 connected to the operating section 12; and an image pickup section driving circuit 16, the temporary storage memory 17, the image processing section 18, the storage medium section 19, a display section 20 and a setting information storage memory section 21 connected to control signal output ports of the control section 13 via buses 14 and 15.

The above temporary storage memory 17, the image processing section 18, the storage medium section 19, the display section 20 and the setting information storage memory section 21 are constituted so that data can be input or output mutually via a bus 22. The image pickup section driving circuit 16 is connected to the CCD image sensor 49 and the CDS/ADC section 24.

The operating section 12 includes various input buttons and switches such as a shutter release button, a camera setting change switch and a focal length change button, and is a circuit which notifies a control section of event information input from the outside (camera user) via these input buttons and switches. The control section 13 is a central processing unit, and is a circuit in which a program memory (not shown) is incorporated. In accordance with a program stored in the program memory, the circuit receives an instruction or a command input from the camera user via the operating section 12 and controls the whole digital camera 40.

The CCD image sensor 49 receives the object image formed via the photographing optical system 41. The CCD image sensor 49 is an image sensor driven and controlled by the image pickup section driving circuit 16 to convert a quantity of light of the object image for each pixel into an electric signal and output the signal to the CDS/ADC section 24.

The CDS/ADC section 24 is a circuit which amplifies the electric signal output from the CCD image sensor 49 to perform analog/digital conversion. The circuit outputs, to the temporary storage memory 17, video bare data (hereinafter referred to as the raw data) subjected to this amplification and digital conversion only.

The temporary storage memory 17 is a buffer constituted of, for example, an SDRAM or the like, and is a memory unit in which the raw data output from the CDS/ADC section 24 is temporarily stored. The image processing section 18 is a circuit which reads out the raw data stored in the temporary storage memory 17 or the storage medium section 19 to electrically perform various types of image processing including distortion correction based on an image quality parameter designated from the control section 13.

The recording medium section 19 is a control circuit of, for example, a device to which a card or stick type recording medium including a flash memory and the like is detachably attached and which records and retains, in the card or stick type flash memory, the raw data transferred from the temporary storage memory 17 and the image data obtained by processing the image by the image processing section 18.

The display section 20 includes the liquid crystal display monitor 47 and a circuit which displays an image, an operation menu and the like in the liquid crystal display monitor 47.

The setting information storage memory section 21 includes an ROM portion in which various image quality parameters are stored beforehand; an RAM portion in which there are stored the image quality parameter selected from the image quality parameters read from the ROM portion, by an input operation of the operating section 12; and a circuit which controls input/output with respect to the memories.

In the digital camera 40 constituted in this manner, the photographing optical system 41 has a sufficiently wide angle of field, is small-sized, has a high zoom ratio and has an image forming performance stabilized in the whole zooming region. In the wide-angle end and the telephoto end, a fast focusing operation is possible.

The present invention may be applied to not only a so-called compact digital camera which photographs a general subject as described above but also a monitoring camera requiring a wide angle of field and a lens interchangeable type camera.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens system comprising, in order from an object side:

a first lens unit having a negative refractive power;

a second lens unit having a positive refractive power; and a third lens unit having a negative refractive power, wherein a space between the first lens unit and the second lens unit changes during magnification change, a space between the second lens unit and the third lens unit changes during the magnification change or a focusing operation;

at least the second lens unit and the third lens unit move to the only object side during the magnification change from a wide-angle end to a telephoto end so that the space between the first lens unit and the second lens unit is narrower in the telephoto end than in the wide-angle end;

the first lens unit comprises, in order from the object side, two lenses including a negative lens and a positive lens, the total number of the lenses included in the first lens unit is two;

the second lens unit comprises at most three lenses;

the third lens unit comprises a negative lens, the total number of the lenses included in the third lens unit is one; and the following conditions (1) and (2) are satisfied:

$$0.7 < C_j(t)/C_j(w) < 1.2 \qquad (1); \text{ and}$$

$$1.6 < \beta_2(t)/\beta_2(w) < 2.5 \qquad (2),$$

in which $C_j(w)$ is a distance from an incidence surface of the first lens unit to an image surface of the zoom lens system in the wide-angle end, $C_j(t)$ is a distance from the incidence surface of the first lens unit to the image surface of the zoom lens system in the telephoto end, $\beta_2(w)$ is a lateral magnification of the second lens unit in the wide-angle end, and $\beta_2(t)$ is a lateral magnification of the second lens unit in the telephoto end.

2. A zoom lens system comprising, in order from an object side:

a first lens unit having a negative refractive power;
a second lens unit having a positive refractive power; and
a third lens unit having a negative refractive power, wherein a space between the first lens unit and the second lens unit changes during magnification change, a space between the second lens unit and the third lens unit changes during the magnification change or a focusing operation;

at least the second lens unit and the third lens unit move to the only object side during the magnification change from a wide-angle end to a telephoto end so that the space between the first lens unit and the second lens unit is narrower in the telephoto end than in the wide-angle end;

the first lens unit comprises, in order from the object side, two lenses including a negative lens and a positive lens, the total number of the lenses included in the first lens unit is two;

the second lens unit comprises at most three lenses;

the third lens unit comprises a negative lens, the total number of the lenses included in the third lens unit is one; and the following conditions (1) and (3) are satisfied:

$$0.7 < C_j(t)/C_j(w) < 1.2 \qquad (1); \text{ and}$$

$$1.0 < \{\beta_2(t)/\beta_2(w)\}/\{\beta_3(t)/\beta_3(w)\} < 2.5 \qquad (3),$$

in which $C_j(w)$ is a distance from an incidence surface of the first lens unit to an image surface of the zoom lens system in the wide-angle end, $C_j(t)$ is a distance from the incidence surface of the first lens unit to the image surface of the zoom lens system in the telephoto end, $\beta_2(w)$ is a lateral magnification of the second lens unit in the wide-angle end, $\beta_2(t)$ is a lateral magnification of the second lens unit in the telephoto end, $\beta_3(w)$ is a lateral magnification of the third lens unit in the wide-angle end, and $\beta_3(t)$ is a lateral magnification of the third lens unit in the telephoto end.

3. A zoom lens system comprising, in order from an object side:

a first lens unit having a negative refractive power;
a second lens unit having a positive refractive power; and
a third lens unit having a negative refractive power, wherein a space between the first lens unit and the second lens unit changes during magnification change, a space between the second lens unit and the third lens unit changes during the magnification change or a focusing operation;

at least the second lens unit and the third lens unit move to the only object side during the magnification change from a wide-angle end to a telephoto end so that the space between the first lens unit and the second lens unit is narrower in the telephoto end than in the wide-angle end;

the first lens unit comprises, in order from the object side, two lenses including a negative lens and a positive lens, the total number of the lenses included in the first lens unit is two;

the second lens unit comprises at most three lenses;

the third lens unit comprises a negative lens, the total number of the lenses included in the third lens unit is one; and the following conditions (1) and (4) are satisfied:

$$0.7 < C_j(t)/C_j(w) < 1.2 \qquad (1); \text{ and}$$

$$1.25 < |f_1/f_2| < 1.86 \qquad (4),$$

in which $C_j(w)$ is a distance from an incidence surface of the first lens unit to an image surface of the zoom lens system in the wide-angle end, $C_j(t)$ is a distance from the incidence surface of the first lens unit to the image surface of the zoom lens system in the telephoto end, $f_1$ is a focal length of the first lens unit, and $f_2$ is a focal length of the second lens unit.

4. A zoom lens system according to claim 1, wherein the following condition (3) is satisfied:

$$1.0 < \{\beta_2(t)/\beta_2(w)\}/\{\beta_3(t)/\beta_3(w)\} < 2.5 \qquad (3),$$

in which $\beta_2(w)$ is a lateral magnification of the second lens unit in the wide-angle end, $\beta_2(t)$ is a lateral magnification of the second lens unit in the telephoto end, $\beta_3(w)$ is a lateral magnification of the third lens unit in the wide-angle end, and $\beta_3(t)$ is a lateral magnification of the third lens unit in the telephoto end.

5. A zoom lens system according to claim 1, 2 or 4, wherein the following condition (4) is satisfied:

$$1.25 < |f_1/f_2| < 1.86 \qquad (4),$$

in which $f_1$ is a focal length of the first lens unit, and $f_2$ is a focal length of the second lens unit.

6. A zoom lens system according to claim 1, wherein only the third lens unit moves during the focusing operation.

7. A zoom lens system according to claim 1, wherein the space between the second lens unit and the third lens unit changes during the magnification change.

8. A zoom lens system according to claim 1, wherein during the magnification change from the wide-angle end to the telephoto end, the first lens unit moves to an image side and then moves to the object side.

9. A zoom lens system according to claim 1, wherein the following condition (5) is satisfied:

$$1.42 < D(w)/f_w < 1.80 \qquad (5),$$

in which $D_1(w)$ is an air space between the first lens unit and the second lens unit along an optical axis in the wide-angle end, and $f_w$ is a focal length of the zoom lens system in the wide-angle end.

10. A zoom lens system according to claim 1, wherein the third lens unit moves for focusing; and
the following condition (6) is satisfied, $$0.5 < D_2(t)/D_2(w) < 2.0 \qquad (6),$$

in which $D_2(w)$ is an air space between the second lens unit and the third lens unit along an optical axis in the wide-angle end, and $D_2(t)$ is an air space between the second lens unit and the third lens unit along the optical axis in the telephoto end.

11. A zoom lens system according to claim 1, wherein the third lens unit moves for focusing; and
the following condition (7) is satisfied:

$$-0.3 < (D_2(t)-D_2(w))/f_w < 0.25 \qquad (7),$$

in which $D_2(w)$ is an air space between the second lens unit and the third lens unit along an optical axis in the wide-angle end, $D_2(t)$ is an air space between the second lens unit and the third lens unit along the optical axis in the telephoto end, and $f_w$ is a focal length of the zoom lens system in the wide-angle end.

12. A zoom lens system according to claim 1 or 11, wherein the second lens unit is constituted of two or three lenses including a positive lens and a negative lens.

13. A zoom lens system according to claim 12, wherein the second lens unit comprises a cemented triplet constituted of, in order from the object side, a positive lens, a negative lens and a positive lens.

14. A zoom lens system according to claim 12, wherein the second lens unit comprises, in order from the object side, a single lens having a positive refractive power and a cemented lens constituted of a negative lens and a positive lens in order from the object side.

15. A zoom lens system according to claim 12, wherein the second lens unit comprises, in order from the object side, a single lens having a positive refractive power and a cemented lens constituted of a positive lens and a negative lens in order from the object side.

16. A zoom lens system according to claim 12, wherein the second lens unit comprises, in order from the object side, a cemented lens constituted of a positive lens and a negative lens in order from the object side, and a single lens having a positive refractive power.

17. A zoom lens system according to claim 12, wherein the second lens unit comprises, in order from the object side, a cemented lens constituted of a positive lens and a negative lens in order from the object side.

18. A zoom lens system according to claim 12, wherein the second lens unit comprises a cemented triplet constituted of a positive lens, a negative lens and a negative lens in order from the object side.

19. A zoom lens system according to claim 1, wherein the following condition (8) is satisfied:

$$1.2 < C_j(t)/f_t < 1.8 \qquad (8),$$

in which $C_j(t)$ is a distance from an incidence surface of the first lens unit to the image surface of the zoom lens system in the telephoto end, and $f_t$ is a focal length of the zoom lens system in the telephoto end.

20. A zoom lens system according to claim 1, wherein the third lens unit moves for focusing;
the third lens unit is a negative lens; and
the following condition (9) is satisfied:

$$1.5 < |f_3/f_w| < 15.0 \qquad (9),$$

in which $f_3$ is a focal length of the third lens unit, and $f_w$ is a focal length of the zoom lens system in the wide-angle end.

21. A zoom lens system according to claim 1, wherein the third lens unit is a negative lens; and
the following condition (10) is satisfied:

$$0.01 < D_{3G}/f_t < 0.09 \qquad (10),$$

wherein $D_{3G}$ is a thickness of the third lens unit along an axis, and $f_t$ is a focal length of the zoom lens system in the telephoto end.

22. A zoom lens system according to claim 1, wherein the third lens unit moves for focusing;
the third lens unit is a negative lens; and
the following condition (B) is satisfied:

$$-3.5 < 1-\beta_3(t)^2 < -0.6 \qquad (B),$$

in which $\beta_3(t)$ is a lateral magnification of the third lens unit in the telephoto end.

23. A zoom lens system according to claim 1, wherein the following condition (A) is satisfied:

$$2.5 \leq f_t/f_w < 5.5 \qquad (A),$$

in which $f_t$ is a focal length of the zoom lens system in the telephoto end, and $f_w$ is a focal length of the zoom lens system in the wide-angle end.

24. A zoom lens system according to claim 1, further comprising:
an aperture stop which is disposed immediately before the second lens unit and which moves integrally with the second lens unit during the magnification change.

25. An image pickup apparatus comprising:
a zoom lens system according to claim 1; and
an image sensor which is disposed on an image side of the zoom lens system and which converts an optical image into an electric signal.

26. An image pickup apparatus according to claim 25, further comprising;
a low pass filter disposed between the zoom lens system and the image sensor.

* * * * *